US 6,986,263 B2
United States Patent
Crisp, III

(10) Patent No.: US 6,986,263 B2
(45) Date of Patent: Jan. 17, 2006

(54) REFRIGERATOR HAVING A BEVERAGE DISPENSER AND A DISPLAY DEVICE

(75) Inventor: Harry Lee Crisp, III, Marion, IL (US)

(73) Assignee: Beverage Works, Inc., Marion, IL (US)

( * ) Notice: Subject to any disclaimer, the term of this patent is extended or adjusted under 35 U.S.C. 154(b) by 65 days.

(21) Appl. No.: 10/852,531

(22) Filed: May 24, 2004

(65) Prior Publication Data

US 2004/0211210 A1 Oct. 28, 2004

Related U.S. Application Data

(63) Continuation of application No. 09/589,725, filed on Jun. 8, 2000, now Pat. No. 6,751,525.

(51) Int. Cl.
*B67D 5/62* (2006.01)

(52) U.S. Cl. .............................. 62/389; 62/390; 62/392
(58) Field of Classification Search .................. 62/389, 62/390, 391, 392, 393, 330, 338, 435, 440; 222/146.6, 129.1, 129.4
See application file for complete search history.

(56) References Cited

U.S. PATENT DOCUMENTS

| | | | |
|---|---|---|---|
| 3,283,530 A | * | 11/1966 | Bayne et al. .................. 62/389 |
| 3,409,175 A | | 11/1968 | Byrne |
| 3,666,143 A | | 5/1972 | Weston |
| 3,878,970 A | | 4/1975 | Nezworski |
| 3,904,079 A | | 9/1975 | Kross |
| 3,938,639 A | | 2/1976 | Birrell |
| 3,949,903 A | | 4/1976 | Benasutti et al. |
| 3,960,298 A | | 6/1976 | Birrell |
| 3,991,911 A | | 11/1976 | Shannon et al. |
| 3,995,441 A | | 12/1976 | McMillin |
| 4,076,145 A | | 2/1978 | Zygiel |

(Continued)

FOREIGN PATENT DOCUMENTS

| | | |
|---|---|---|
| EP | 0 301 169 A1 | 2/1989 |
| EP | 0166 586 B1 | 1/1991 |
| EP | 0 236 633 B1 | 5/1991 |
| EP | 0 478 624 B1 | 4/1992 |
| GB | 2 067 800 A | 7/1981 |
| JP | 403134455 A * | 6/1991 |
| JP | 404363570 A * | 12/1992 |
| WO | WO 89/05029 | 6/1989 |
| WO | WO 89/11443 | 11/1989 |
| WO | WO 91/00238 | 1/1991 |
| WO | WO 95/11855 | 5/1995 |
| WO | WO 99/03776 | 1/1999 |
| WO | WO 99/26860 | 6/1999 |
| WO | WO 99/65818 | 12/1999 |
| WO | WO 01/11281 A1 | 2/2001 |

OTHER PUBLICATIONS

Beverage Express from www.beverageexpress.com printed on May 2, 2000.
BevStar Bottled Water Model Advertisement.
BevStar Point of Use Water Model Advertisement.
BreakMate™ from www.bestrom.com printed on May 30, 2000.

(Continued)

*Primary Examiner*—William E. Tapolcai
*Assistant Examiner*—Mohammad M. Ali
(74) *Attorney, Agent, or Firm*—Bell, Boyd & Lloyd, LLC

(57) ABSTRACT

A beverage distribution and dispensing system and method for distributing drinks such as soda, juice and punch, to a home or business and which involves a computerized system which enables users to dispense such drinks from their refrigerator. The computerized system monitors its own supply levels and, when necessary, automatically orders and delivers drink syrups and $CO_2$ gas supplies. The computerized system can automatically detect dispensing problems and orders and arranges for repair service.

20 Claims, 17 Drawing Sheets

U.S. PATENT DOCUMENTS

| | | | |
|---|---|---|---|
| 4,143,793 A | 3/1979 | McMillin et al. | |
| 4,172,669 A | 10/1979 | Edelbach | |
| 4,174,872 A | 11/1979 | Fessler | |
| 4,181,242 A | 1/1980 | Zygiel et al. | |
| RE30,301 E | 6/1980 | Zygiel | |
| 4,218,014 A | 8/1980 | Tracy | |
| 4,222,972 A | 9/1980 | Caldwell | |
| 4,237,536 A | 12/1980 | Enelow et al. | |
| 4,252,253 A | 2/1981 | Shannon | |
| 4,264,019 A * | 4/1981 | Roberts et al. | 222/95 |
| 4,265,376 A | 5/1981 | Skidell | |
| 4,333,587 A | 6/1982 | Fessler et al. | |
| 4,354,613 A | 10/1982 | Desai et al. | |
| 4,358,171 A | 11/1982 | Christen | |
| 4,377,246 A | 3/1983 | McMillin et al. | |
| 4,392,588 A | 7/1983 | Scalera | |
| 4,413,752 A | 11/1983 | McMillin et al. | |
| 4,458,584 A | 7/1984 | Annese et al. | |
| 4,466,342 A | 8/1984 | Basile et al. | |
| 4,475,448 A | 10/1984 | Shoaf et al. | |
| 4,496,078 A | 1/1985 | Nelzow et al. | |
| 4,509,690 A | 4/1985 | Austin et al. | |
| 4,520,950 A | 6/1985 | Jeans | |
| 4,549,675 A | 10/1985 | Austin | |
| 4,553,573 A | 11/1985 | McGarrah | |
| 4,560,089 A | 12/1985 | McMillin et al. | |
| 4,566,287 A * | 1/1986 | Schmidt et al. | 62/188 |
| 4,577,782 A | 3/1986 | Fessler | |
| 4,582,223 A | 4/1986 | Kobe | |
| RE32,179 E | 6/1986 | Sedam et al. | |
| 4,629,090 A | 12/1986 | Harris et al. | |
| 4,651,862 A | 3/1987 | Greenfield, Jr. | |
| 4,658,988 A | 4/1987 | Hassell | |
| 4,687,120 A | 8/1987 | McMillin | |
| 4,709,835 A | 12/1987 | Kruger et al. | |
| 4,711,374 A | 12/1987 | Gaunt et al. | |
| 4,719,056 A | 1/1988 | Scott | |
| 4,726,494 A | 2/1988 | Scott | |
| 4,747,516 A | 5/1988 | Baker | |
| 4,765,513 A | 8/1988 | McMillin et al. | |
| 4,766,548 A | 8/1988 | Cedrone et al. | |
| 4,781,309 A | 11/1988 | Vogel | |
| 4,791,411 A | 12/1988 | Starr | |
| 4,800,492 A | 1/1989 | Johnson et al. | |
| 4,824,075 A | 4/1989 | Holzboog | |
| 4,827,426 A | 5/1989 | Patton et al. | |
| 4,850,269 A | 7/1989 | Hancock et al. | |
| 4,856,684 A | 8/1989 | Gerstung | |
| 4,860,923 A * | 8/1989 | Kirschner et al. | 222/1 |
| 4,901,887 A | 2/1990 | Burton | |
| 4,921,315 A | 5/1990 | Metcalfe et al. | |
| 4,930,666 A | 6/1990 | Rudick | |
| 4,932,564 A | 6/1990 | Austin et al. | |
| 4,936,488 A | 6/1990 | Austin | |
| 4,937,019 A | 6/1990 | Scott | |
| 4,960,261 A | 10/1990 | Scott et al. | |
| 4,961,533 A | 10/1990 | Teller et al. | |
| 4,974,643 A | 12/1990 | Bennett et al. | |
| 4,982,876 A | 1/1991 | Scott | |
| 4,993,604 A | 2/1991 | Gaunt et al. | |
| 5,000,357 A | 3/1991 | Shannon et al. | |
| 5,007,560 A | 4/1991 | Sassak | |
| 5,033,645 A | 7/1991 | Shannon et al. | |
| 5,040,106 A | 8/1991 | Maag | |
| 5,044,171 A | 9/1991 | Farkas | |
| 5,129,548 A | 7/1992 | Wisniewski | |
| 5,129,549 A | 7/1992 | Austin | |
| 5,139,708 A | 8/1992 | Scott | |
| 5,156,301 A | 10/1992 | Hassell et al. | |
| 5,156,871 A | 10/1992 | Goulet et al. | |
| 5,165,575 A | 11/1992 | Scott | |
| 5,190,083 A | 3/1993 | Gupta et al. | |
| 5,190,189 A | 3/1993 | Zimmer et al. | |
| 5,193,718 A | 3/1993 | Hassell et al. | |
| 5,203,474 A | 4/1993 | Haynes | |
| 5,228,312 A | 7/1993 | Williams | |
| 5,228,486 A | 7/1993 | Henninger | |
| 5,240,144 A | 8/1993 | Feldman | |
| 5,263,509 A | 11/1993 | Cherry et al. | |
| 5,269,156 A | 12/1993 | van de Velde et al. | |
| 5,269,442 A | 12/1993 | Vogel | |
| 5,280,711 A | 1/1994 | Motta et al. | |
| 5,297,400 A | 3/1994 | Benton et al. | |
| 5,303,846 A | 4/1994 | Shannon | |
| 5,320,817 A | 6/1994 | Hardwick et al. | |
| 5,343,716 A | 9/1994 | Swanson et al. | |
| 5,368,198 A | 11/1994 | Goulet | |
| 5,392,960 A | 2/1995 | Kendt et al. | |
| 5,411,179 A | 5/1995 | Oyler et al. | |
| 5,417,146 A | 5/1995 | Zimmer et al. | |
| 5,437,395 A | 8/1995 | Bull et al. | |
| 5,454,406 A | 10/1995 | Rejret et al. | |
| 5,538,160 A | 7/1996 | Ziesel | |
| 5,542,265 A | 8/1996 | Rutland | |
| 5,553,746 A | 9/1996 | Jones | |
| 5,553,755 A | 9/1996 | Bonewald et al. | |
| 5,568,882 A | 10/1996 | Takacs | |
| 5,570,587 A | 11/1996 | Kim | |
| 5,575,405 A * | 11/1996 | Stratton et al. | 222/1 |
| 5,603,230 A | 2/1997 | Tsai | |
| 5,607,083 A | 3/1997 | Vogel et al. | |
| 5,608,643 A | 3/1997 | Wichter et al. | |
| 5,611,867 A | 3/1997 | Cooper et al. | |
| 5,626,407 A | 5/1997 | Westcott | |
| 5,647,512 A | 7/1997 | de Oliveira et al. | |
| 5,667,110 A | 9/1997 | McCann et al. | |
| 5,694,794 A | 12/1997 | Jerg et al. | |
| 5,699,328 A | 12/1997 | Ishizaki et al. | |
| 5,706,191 A | 1/1998 | Bassett et al. | |
| 5,706,976 A | 1/1998 | Purkey | |
| 5,721,693 A | 2/1998 | Song | |
| 5,732,563 A | 3/1998 | Bethuy et al. | |
| 5,743,433 A * | 4/1998 | Hawkins et al. | 222/64 |
| 5,745,366 A | 4/1998 | Highma et al. | |
| RE35,780 E | 5/1998 | Hassell et al. | |
| 5,774,053 A | 6/1998 | Porter | |
| 5,785,470 A | 7/1998 | Scheufler | |
| 5,791,517 A | 8/1998 | Avital | |
| 5,791,523 A | 8/1998 | Oh | |
| 5,797,519 A | 8/1998 | Schroeder et al. | |
| 5,829,085 A | 11/1998 | Jerg et al. | |
| 5,845,815 A | 12/1998 | Vogel | |
| 5,855,296 A | 1/1999 | McCann et al. | |
| 5,862,961 A | 1/1999 | Motta et al. | |
| 5,875,930 A | 3/1999 | Nakajima et al. | |
| 5,899,245 A | 5/1999 | Wrigley et al. | |
| 5,901,884 A | 5/1999 | Goulet et al. | |
| 5,907,285 A | 5/1999 | Toms et al. | |
| 5,920,801 A | 7/1999 | Thomas et al. | |
| 5,956,967 A | 9/1999 | Kim | |
| 5,967,367 A | 10/1999 | Orsborn | |
| 5,979,668 A | 11/1999 | Kane et al. | |
| 5,979,694 A | 11/1999 | Bennett et al. | |
| 5,980,959 A | 11/1999 | Frutin | |
| 5,987,105 A | 11/1999 | Jenkins et al. | |
| 5,988,346 A | 11/1999 | Tedesco et al. | |
| 5,993,739 A | 11/1999 | Lyon | |
| 6,012,450 A | 1/2000 | Rubsamen | |
| 6,036,166 A | 3/2000 | Olson | |
| 6,039,219 A | 3/2000 | Bach et al. | |
| 6,041,970 A | 3/2000 | Vogel | |

| | | | |
|---|---|---|---|
| 6,056,194 A | | 5/2000 | Kolls |
| 6,085,740 A | | 7/2000 | Ivri et al. |
| 6,101,452 A | | 8/2000 | Krall et al. |
| 6,138,693 A | | 10/2000 | Matz |
| 6,161,059 A | * | 12/2000 | Tedesco et al. ............. 700/232 |
| 6,181,981 B1 | | 1/2001 | Varga et al. |
| 6,204,763 B1 | | 3/2001 | Sone |
| 6,230,767 B1 | * | 5/2001 | Nelson ....................... 141/264 |
| 6,234,223 B1 | | 5/2001 | Nelson |
| 6,237,812 B1 | | 5/2001 | Fukada |
| 6,264,548 B1 | | 7/2001 | Payne et al. |
| 6,305,269 B1 | * | 10/2001 | Stratton ..................... 99/323.1 |
| 6,321,985 B1 | | 11/2001 | Kolls |
| 6,394,311 B2 | | 5/2002 | McCann et al. |
| 6,411,462 B1 | | 6/2002 | Ostwald et al. |
| 6,457,038 B1 | | 9/2002 | Defosse |
| 6,491,047 B2 | | 12/2002 | Abe |
| 6,526,824 B2 | | 3/2003 | Chase et al. |
| 6,536,224 B2 | | 3/2003 | Frank et al. |
| 6,536,626 B2 | | 3/2003 | Newman et al. |
| 6,581,804 B1 | | 6/2003 | Ciavarella et al. |
| 6,766,656 B1 | | 7/2004 | Crisp, III et al. |
| 6,799,085 B1 | | 9/2004 | Crisp, III |
| 2004/0250564 A1 | | 12/2004 | Crisp, IIII et al. |

OTHER PUBLICATIONS

Brown, Erika, "Best of the Web—General Electric," Forbes, May 21, 1001, p. 80.

"Co's Join On Home Web Wiring Network," from http://content.../content.asp printed on Jun. 7, 2000.

Fisher, Daniel, "Gone Flat," Forbes, Oct. 15, 2001, pp. 76–79.

Isoworth Beverage Dispensing Technology Worldwide Company Brochure.

Isoworth Beverage Dispensing Technology Worldwide from www.bevstar.com printed on May 22, 2000.

Margherita2000.com from www.margherita2000.com printed Jan. 26, 2001.

Soda—Club Enterprises from www.sodaclubenterprises.com printed on May 2, 2000.

Steiner, Rupert, "Coke chief's latest Daft idea—a cola tap in every house," Sunday Times, Mar. 18, 2001.

"Sunbeam Joins Microsoft in University Plug and Play Forum," Mar. 23, 2000.

Swiss Mountain Coffees from www.ecommerce.dewpoint-inc.com printed on May 30, 2000.

Symbol from www.symbol.com printed on Dec. 12, 2000.

"The fridge that makes shopping 'Cool'," from www.icl.com printed on May 2, 2000.

The FuzzyLogic Beverage Dispenser—Remote Controlled or for Water Self–Service from www.bonator.com printed on May 2, 2000.

Tour A Virtual Trade Show from appliancemagazine.com printed on May 2, 2000.

Wardell, Charles, "Help for Hurried Cooks?" Popular Science, May, 2000, p. 32.

"Whirlpool Internet–Enabled Appliances to Use Beeline Shopper Software Features," Feb. 16, 2001.

Wunder–Bar Dispensing Systems from www.wunderbar.com printed on May 2, 2000.

* cited by examiner

Change Brands

| Soft Drinks | Juice | Teas | Isotonics |
| Cola | Orange | Plain | Lemon-Lime |
| Citrus | Apple | Sweet | Punch |
| Orange | Grape | Sweet w/lemon | |
| Grape | | Peach | |
| Strawberry | | Rasberry | |
| Pepper | | | |
| [Root Beer] | | | |
| Lemon Lime | | | |
| Punch | | | |

48b

Soft Drinks: Root Beer

FIG. 3D  Which brand would you like to replace?
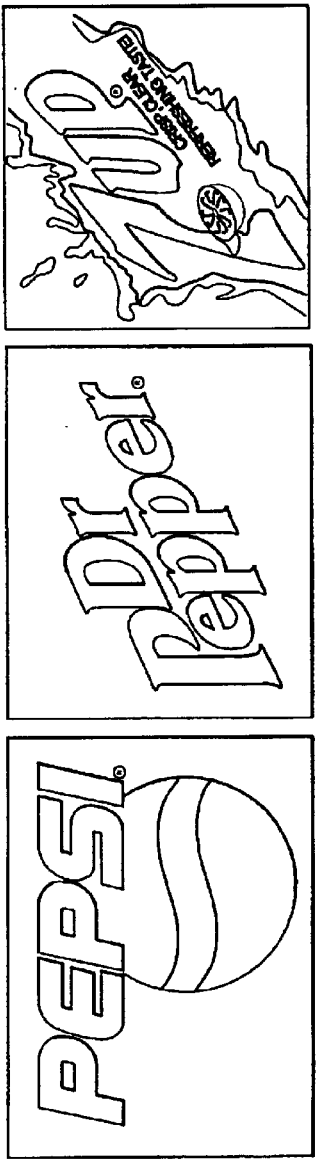
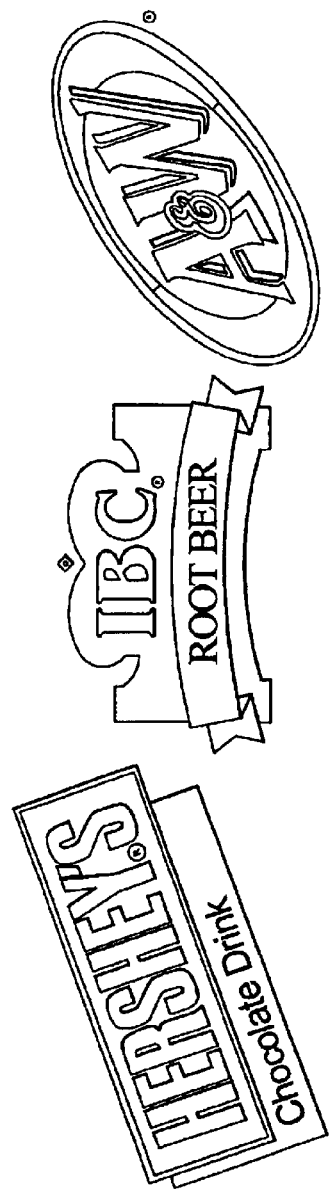
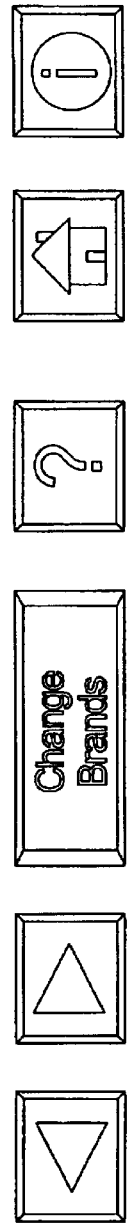

Replace  with

Beverage Works
For assistance, please call
1-800-827-7020

48g

Change Brands

Information about the Brands

| Soft Drinks | Juice | Teas | Isotonics |
| Cola | Orange | Plain | Lemon-Lime |
| Citrus | Apple | Sweet | Punch |
| Orange | Grape | Sweet w/lemon | |
| Grape | | Peach | |
| Strawberry | | Rasberry | |
| Pepper | | | |
| Root Beer | | | |
| [Lemon Lime] | | | ← 48h |
| Punch | | | |

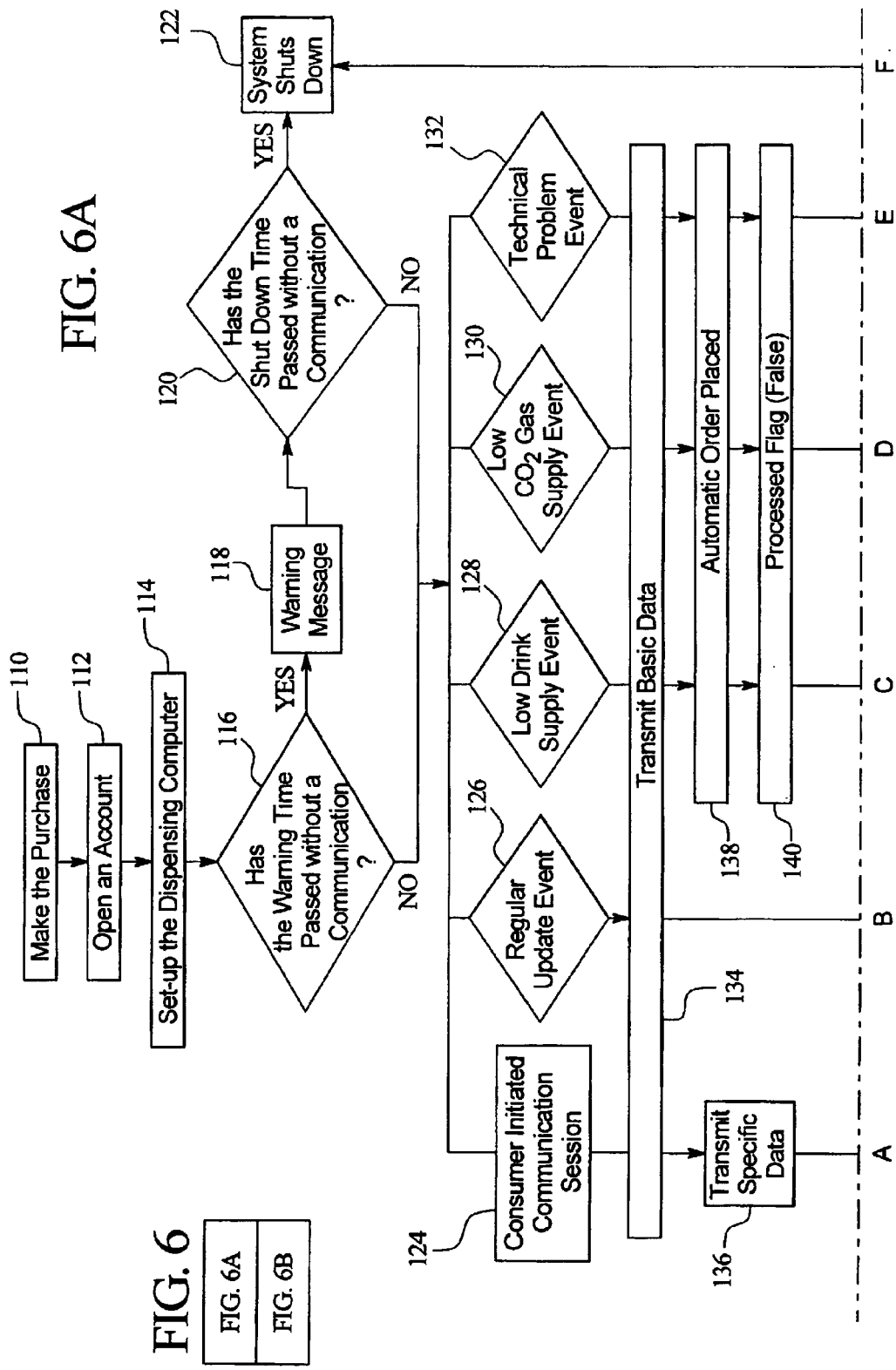

FIG. 7

| Basic Data 200 | User Data 214 | Supplier Data 216 | Specific Data 218 | | Drink Concentrate Data 222 | Event Data 224 | Service Data 226 |
|---|---|---|---|---|---|---|---|
| | | | Dispensing Apparatus Data | Dispensing Computer Setting Data 220 | | | |
| 202 Dispensing Apparatus Unit Identification | User ID | Supplier ID | Disp. Unit ID | Disp. Computer Setting ID | Conc. ID | Event ID | Service ID |
| 204 Drink Concentrate Identification | Supplier ID | Company Name | Unit Code | Disp. Computer Setting ID | Conc. Name | Date/Time Stamp | Service |
| 206 Drink Concentrate Amount per Pump | Company Name | | Conc. ID 1 | | Logo | Event Type: 1. Regular update; 2. Low drink supply; 3. Low $CO_2$ gas supply; 4. Technical problem | |
| 208 $CO_2$ Gas Supply Amount | Dispens. Unit ID | | Conc. Level 1 | | | | |
| 210 Event Identification | Last Name | | Conc. ID 2 | | | | |
| 212 Usage Information | First Name | | Conc. Level 2 | | | | |
| | Street | | Conc. ID 3 | | | Number of Drink Conc. Containers | |
| | City | | Conc. Level 3 | | | | |
| | State | | Conc. ID 4 | | | Drink Conc. Authorization Code | |
| | Zip Code | | Conc. Level 4 | | | | |
| | Phone | | Conc. ID 5 | | | Number of $CO_2$ Gas Containers | |
| | | | Conc. Level 5 | | | | |
| | | | Conc. ID 6 | | | Service ID | |
| | | | Conc. Level 6 | | | | |
| | | | $CO_2$ Level 1 | | | Processed Flag (True/False) | |
| | | | Disp. Computer Setting ID | | | | |

213

REFRIGERATOR HAVING A BEVERAGE DISPENSER AND A DISPLAY DEVICE

PRIORITY CLAIM

This application is a continuation of, claims priority to and the benefit of U.S. patent application Ser. No. 09/589,725, filed Jun. 8, 2000, now U.S. Pat. No. 6,751,525, entitled "Beverage Distribution and Dispensing System and Method," the disclosure of which is incorporated herein in it entirety.

CROSS REFERENCES TO RELATED APPLICATIONS

This application is related to the following commonly owned co-pending patent applications: "Beverage Distribution and Dispensing System and Method," Ser. No. 09/589,725, (Referenced Above); "Appliance Supply Distribution, Dispensing and Use System and Method," Ser. No. 10/035,734, "Beverage Dispensing Apparatus," Ser. No. 10/007,419, "Beverage Dispensing Apparatus Having Fluid Director," Ser. No. 10/007,059, "Beverage Dispensing Apparatus Having Drink Supply Canister Holder," Ser. No. 10/011,173, "Beverage Dispensing Apparatus Having Carbonated And Non-Carbonated Water Supplier," Ser. No. 10/007,438, "Drink Supply Canister for Beverage Dispensing Apparatus," Ser. No. 10/010,108, "Improved Drink Supply Canister for Beverage Dispensing Apparatus," Ser. No. 10/137,608, "Beverage Dispensing System and Apparatus," Ser. No. 10/852,077, and "System and Method for Distributing Drink Supply Containers," Ser. No. 10/852,389.

COPYRIGHT NOTICE

A portion of the disclosure of this patent document contains material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

DESCRIPTION

The present invention relates in general to a system and method for distributing and dispensing beverages, and in particular to a beverage distribution and dispensing system which enables users to dispense a plurality of beverages from a refrigerator, which tracks beverage consumption and the use of the drink supply and $CO_2$ supply, which automatically orders drink supply and $CO_2$ supply as necessary, which facilitates the delivery of drink supply and $CO_2$ supply to the users, which enables the users to determine beverage consumption and to change the dispensed beverages, and which reduces the need to store conventional beverage containers in the refrigerators of the users.

BACKGROUND OF THE INVENTION

Many households in the United States and throughout the world consume large volumes of beverages such as soft drinks, soda, juices, lemonade, teas, isotonics, fruit drinks and other drinks on a daily basis. For instance, in 1998, retail sales of soft drinks in the United States were approximately fifty-four billion dollars, retail sales of fruit beverages in the United States were approximately seventeen and a half billion dollars and retail sales of isotonics in the United States were approximately two and a quarter billion dollars.

To maintain an adequate supply of such beverages, consumers must continuously supply their homes with various bottled and canned beverages, or must make beverages such as ice tea, lemonade and fruit punches by hand. These tasks can be relatively burdensome for families which experience a large consumption of beverages, in part because the beverage containers are somewhat heavy, the beverage containers occupy substantial space in their refrigerators, and the time to make the beverages can be substantial on a annual basis. Additionally, the cost in dollars and time of purchasing such beverages on an annual basis can be significant as indicated above.

Commercial drink dispensing machines and systems for monitoring such drink dispensing machines are well known. For example, U.S. Pat. Nos. 4,237,536, 4,766,548, 4,800,492, 4,827,426, 5,190,083, 5,608,643 and Re. 32,179 disclose commercial drink dispensing apparatuses and monitoring systems for commercial drink dispensing apparatuses.

U.S. Pat. No. 4,237,536 discloses a central console that can be located at a hotel front desk for controlled dispensing of beverages from remotely located reservoirs located in remote locations such as hotel rooms. Upon the request of a hotel guest, a reservoir at a remote location dispenses beverage. The central console monitors each time a beverage is dispensed at each remote location to determine the total amount of beverages dispensed so that the guests can be charged for each drink when checking out of the hotel. The central console also monitors operation of the remote dispensing units to determine information such as when the reservoirs are empty.

U.S. Pat. No. 4,766,548 discloses a microprocessor controlled system for monitoring and reporting on data related to operation of soft drink vending machines to a remotely located central computer over non-dedicated telephone lines. The system can be used to monitor the operation of commercial drink dispensing systems to determine information such as run or on times (e.g., the run time of a carbonator or the on time of a dispensing valve) and dispensing information (e.g., the type and quantity of product dispensed). The monitored information can be periodically reported to one or more different facilities, such as a customer account, a bottler servicing the account or a regional office.

U.S. Pat. No. 4,800,492 discloses a microprocessor based data logger for a post-mix beverage dispensing system that determines the number and size of particular drinks sold over pre-selected time intervals based upon the opening and closing of each valve assembly associated with dispensing equipment. The data logger is a metal box externally attached to the dispensing equipment to collect data for days or weeks. The stored data subsequently is loaded onto a portable computer for further processing and interpretation.

U.S. Pat. No. 4,827,426 discloses a soft drink or beverage dispenser that monitors "Smart Valve" output to determine information such as the amount of water and syrup dispensed for a period of time. More specifically, information monitored by the system includes total drinks by size, mixture ratios, total syrup and water volumes, yield per gallon of syrup, syrup viscosity, portion sizes, syrup identification numbers and syrup temperature. Acquired data is transmitted to either a computer on site or over telephone lines to a central location.

U.S. Pat. No. 5,190,083 discloses a system for dispensing and monitoring output and consumption of fluids including carbonated beverages in outer space. The system includes a computerized monitor that identifies users, tabulates fluid withdrawal and calculates recent consumption over a predefined period of time.

U.S. Pat. No. 5,608,643 discloses a system for managing and remotely monitoring multiple dispensing units via a communications network such as, for example, a cellular radio network, a wide area RF network or a satellite network. The system includes a dispensing unit such as soft drink vending machines with a number of bins, with each bin holding a quantity of a specific product that a consumer can select. Each dispensing bin includes a reference level sensor that determines when the quantity of product falls below a reference level that is higher than an out of stock level. The dispensing unit transmits status information via the communication network when the product level falls below the reference level, to indicate that a particular bin needs to be restocked.

U.S. Pat. No. Re. 32,179 discloses a post-mix carbonated beverage dispensing system for use in refrigerated cabinets.

Certain types of non-commercial drink dispensing systems are also well known. For instance, countertop beverage dispensing systems which dispense a limited number of drinks, such as those commercially available from Bev Star, Inc. are well known.

Many conventional refrigerators are equipped with icemakers and water dispensers for dispensing ice and water. It is also known that refrigerators can be used to dispense other drinks. For example, U.S. Pat. No. 5,956,967 discloses a refrigerator with a drink dispenser assembly and a mechanism for selecting the dispensed drink. This system reduces the need for consumers to store drink containers in their refrigerators because this system uses a concentrated drink supply or syrup. However, a consumer using this type of system must keep track of the drink supply or syrup levels and the $CO_2$ gas levels, must regularly purchase the drink supply or syrup and $CO_2$ gas supply and must maintain and repair such dispensing systems. Such systems are also not readily adapted for dispensing a plurality of non-carbonated drinks, enabling the user to readily switch drinks or for facilitating delivery of drink supply and $CO_2$ supply directly to the consumers based on the consumer's usage and the consumer's requests. Accordingly, there is a need for an improved in-home or residential carbonated and non-carbonated beverage distribution and dispensing system.

SUMMARY OF THE INVENTION

The present invention provides a beverage distribution and dispensing system which solves the above problems by enabling users to obtain a plurality of carbonated and non-carbonated beverages from a conventional refrigerator, and which tracks, automatically orders and delivers supplies necessary for making the beverages to the homes of the users of the present system. The beverage distribution and dispensing system of the present invention is referred to herein for brevity alternatively as the "system,""distribution system,""dispensing system" or the "beverage dispensing system." However, the scope of the present invention is not intended to be limited by such abbreviated terms or the use of any other abbreviated terms used herein to describe the present invention or components, steps or processes thereof. It should also be appreciated that several of the figures of this application include one or more of the following trademarks, which are not part of the system of the present invention: (a) BEVERAGE WORKS; (b) BEVERAGE WORKS and Design; (c) PEPSI; (d) PEPSI and Design; (e) DR. PEPPER; (f) DR. PEPPER and Design; (g) HERSHEY'S; (h) HERSHEY'S and Design; (i) IBC ROOT BEER; (j) IBC ROOT BEER and Design; (k) A&W; (l) A&W and Design; (m) MUG; (n) MUG and Design; (o) HIRES; (p) HIRES and Design; (q) 7UP; and (r) 7UP and Design.

Generally, the system of the present invention includes a plurality of beverage dispensing apparatuses housed in a plurality of residential refrigerators or refrigeration devices, at least one ordering processing system which communicates with the beverage dispensing apparatuses through a suitable communication channel and a plurality of supplier systems which communicate with the order processing system through a suitable communication channel. For purposes of this application, the present invention will be described in relation to one beverage dispensing apparatus, one ordering processing system and one supplier system. It should be appreciated that the system preferably includes a plurality of dispensing apparatuses in the refrigerators in the homes of a plurality of users and a plurality of supplier systems which are preferably, but not necessarily, located in the geographic vicinity of the users to facilitate rapid and less expensive delivery of the ordered drink supply containers and $CO_2$ supply containers to users of system. Delivery by local suppliers, distributors or bottlers will also conform to current business agreements between certain distributors or bottlers and syrup suppliers.

The beverage dispensing apparatus in the refrigerator is adapted to dispense at least one, and preferably a plurality of beverages pre-selected by the user. The beverage dispensing apparatus includes a beverage dispensing computer or processor, a user interface panel or terminal connected to the dispensing processor, a dispenser or beverage mixing mechanism connected to the beverage dispensing processor, a drink, concentrate or syrup supply mechanism or apparatus connected to the dispenser, a $CO_2$ supply mechanism or apparatus connected to the beverage dispenser, and a water supply mechanism or apparatus connected to the dispenser. The drink supply mechanism includes a housing for storing a plurality of drink supply containers and at least one pump or other suitable mechanism for drawing the drink supply from the drink supply containers. The $CO_2$ supply mechanism includes a housing for storing at least one and potentially a plurality of $CO_2$ supply containers or canisters and a suitable mechanism for releasing the $CO_2$ from the $CO_2$ supply containers. Preferably, one readily accessible housing is adapted to hold the drink supply containers and $CO_2$ supply containers. This enables the user to easily change the drink supply containers and $CO_2$ supply containers. The drink supply containers and $CO_2$ supply containers are also preferably suitably sized to fit within the housing and are suitably sized for shipment via conventional delivery services.

The beverage dispensing apparatus forms the beverages from the water supply, drink supply, and if the drink is carbonated, the $CO_2$ gas supply. The dispensing computer preferably tracks (by timing) the volume of drink supply dispensed by the dispenser from each drink supply container. The dispensing computer may additionally track (by timing) the volume of $CO_2$ gas dispensed from each $CO_2$ supply container. When supply levels decrease below a predetermined level (i.e., preferably within three days of depletion based on normal or average usage), the dispensing computer automatically sends an order for new drink supply and a new $CO_2$ supply to the order processing system. When the new drink and $CO_2$ supplies are delivered to the consumer's home, the consumer replaces the used drink supply containers with the new drink supply containers and replaces the used $CO_2$ supply containers with the new $CO_2$ supply containers, preferably when the dispensing computer and interface inform the user that the drink supply or $CO_2$ supply is empty.

The dispensing computer and the user interface panel or terminal coact to enable the user to register as a user with the order processing system, order additional drink and $CO_2$ supplies as desired, and to change the drinks dispensed by the dispensing apparatus. For instance if the user is hosting an event such as a party or the user wants to try a new beverage, the user enters such orders through the user interface panel. Furthermore, if the dispensing apparatus breaks down or has any mechanical or technical problems, the system automatically orders repair services, which causes a repair service to contact the consumer, determine an acceptable repair date and to repair the dispensing apparatus on the repair date.

In one embodiment of the present invention, the dispensing computer directly communicates with the order processing system through communication channels such as existing telephone lines, cable lines, wireless communications or the internet. In a preferred embodiment of the present invention, the dispensing computer communicates with a home area or home gateway network in the home of the user which facilitates communication between home appliances, audio and visual equipment, and computing devices. Such home gateway networks enable users to monitor and control all of the electronic equipment in their homes. The home gateway network in turn communicates over a suitable communication channel with the order processing system.

After a refrigerator having the dispensing apparatus of the present invention is installed in a user's home and the dispensing computer establishes communication with the order processing system indirectly through the home gateway network or directly through another suitable communication channel, the user uses the user interface panel to select a plurality of drinks. The system automatically orders appropriate drink supplies and $CO_2$ supplies (if the refrigerator is purchased without such drink or $CO_2$ supplies). Preferably within three days, the supply system delivers the ordered drink supplies and $CO_2$ supplies to the user and user installs the supply containers in the beverage dispensing apparatus to begin to dispense drinks. The dispensing computer monitors the level of drink supply (and possibly $CO_2$ supply) and orders more drink supply and $CO_2$ supply when the drink supply and $CO_2$ supply, respectively, reach certain predetermined levels.

The order processing system receives and processes orders from a plurality of dispensing computers and transmits the orders to the appropriate supplier systems which are designated to serve the users. The order processing system generally includes a server or processor for receiving and processing the orders from the dispensing computers and for sending the orders to the supply systems, a data storage device for storing historic order and consumption information as well as beverage and other information, access terminals and input/output devices.

The supplier system receives orders from the order processing system for particular users (preferably in a predetermined geographic region) and facilitates the delivery of drink supply and $CO_2$ supply to such users of the system of the present invention. The supplier system generally includes a server or processor for receiving the selected orders from the order processing system and for facilitating order fulfillment, access terminals and input/output devices. The supplier system also provides a deliverer for delivering the drink supply containers and $CO_2$ supply containers to the user and provides for repair services for the dispensing apparatuses. Any suitable deliverer may deliver the drink supply container and $CO_2$ supply container to the user; however, preferably the drink supply and $CO_2$ supply are delivered by a common carrier such as the postal service, United Parcel Service, Federal Express, etc. It should be appreciated that while the drink supply containers and the $CO_2$ supply containers or canisters could be of any suitable size, in the preferred embodiments of the present invention, the drink supply containers and the $CO_2$ supply containers are suitably sized for such commercial shipment and to fit in the appropriate housing in the refrigerator.

The system of the present invention enables a user or consumer to sample a plurality of various soft drinks and other drinks which the user would not necessarily have the ability to sample or obtain. For a variety of reasons, many beverage products are unavailable to consumers in many parts of the United States and in many parts of the world. The system provides an interface through which the user can select any beverage which is supplied by the implementor of the system. The present invention makes a plurality of drinks available to the user including drinks not generally available in the user's geographic area. The present invention thus provides a direct beverage distribution system to the user of the system as well as a beverage sampling system which enables users of the system to sample products on a regular basis including products or beverages the user would not normally be exposed to.

It should also be appreciated that the present invention prevents waste of beverages and beverage containers. The dispensing apparatus enables the user to dispense the exact amount of beverage which the user desires and enables the user to easily obtain more beverage if desired. This is especially useful for children in the user's home which tend to drink smaller portions. The present invention thereby eliminates much of the waste of unfinished beverage containers, especially carbonated beverages that tend to lose their carbonation or go "flat" after the container is opened.

Accordingly, the beverage distribution and dispensing system of the present invention: (a) employs a conventional refrigerator to enable a user to dispense a plurality of beverages selected by the user; (b) tracks the drink supply and $CO_2$ supply usage; (c) automatically orders drink supply and $CO_2$ supply as necessary; (d) enables the users to monitor beverage consumption; (e) enables the user to select the beverages from a large number of available beverages and to sample a wide variety of beverages; (f) enables the user to change the beverages dispensed; (g) facilitates direct delivery of drink supply containers and $CO_2$ supply containers to the user; (h) orders repairs as necessary; (i) notifies users of new drinks available through the drink dispensing system; (j) reduces the need to store conventional beverage containers in refrigerators; (k) reduces beverage waste; (l) reduces waste of containers and container materials by providing the same amount of beverages in smaller and fewer containers; and (m) reduces the need for homeowners, consumers, customers and other users of the system (referred to herein as "users") to purchase for their homes bottles, cans and containers of numerous different types of beverages including carbonated and non-carbonated drinks.

It is therefore an object of the present invention to provide a beverage distribution and dispensing system.

A further object of the present invention is to provide a beverage distribution and dispensing system which dispenses a plurality of carbonated and non-carbonated drinks from a conventional refrigerator.

Another object of the present invention is to provide a beverage distribution and dispensing system which automatically reorders drink supply and $CO_2$ supply.

Yet another object of the present invention is to provide a beverage distribution and dispensing system which enables users to determine drink consumption, order additional drink and $CO_2$ supplies and to change drink selections.

Other objects, features and advantages of the invention will be apparent from the following detailed disclosure, taken in conjunction with the accompanying sheets of drawings, wherein like numerals refer to like parts, elements, components, steps and processes.

BRIEF DESCRIPTION OF THE DRAWINGS

FIGS. 3A to 3J are illustrations of interfaces accessible to the user in one embodiment of the system of the present invention;

FIG. 7 is a table illustrating data transmitted to and from the server and data stored on the server of one embodiment of the present invention.

DETAILED DESCRIPTION OF THE INVENTION

Figure 1:
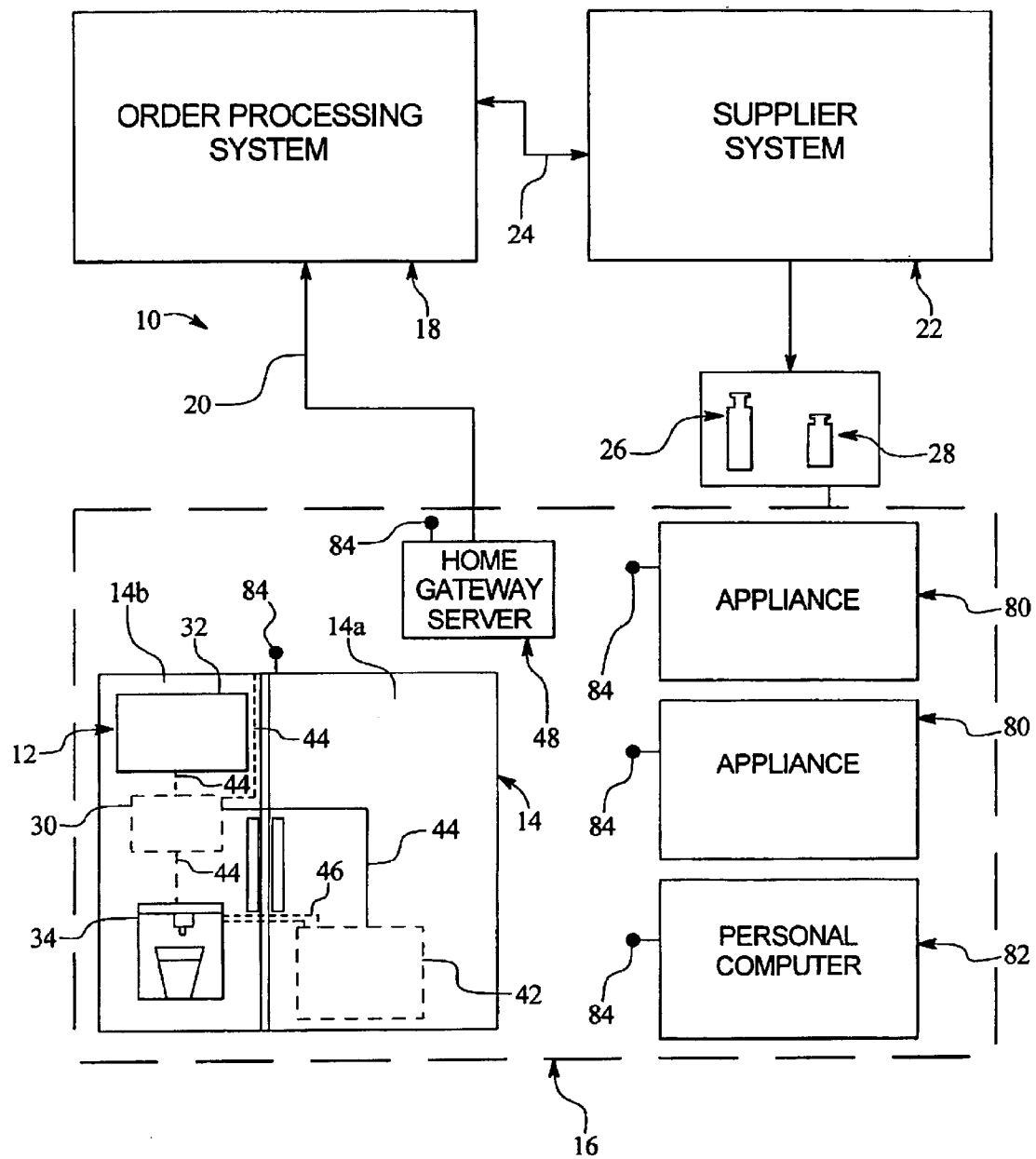
FIG. 1 is a schematic diagram of one embodiment of the system of the present invention.

Referring now to the drawings and in particular to FIG. 1, the preferred embodiment of the beverage distribution and dispensing system of the present invention, generally indicated by numeral 10, includes: (i) a dispensing apparatus 12 in a refrigerator 14 in the home 16 of a user which creates and dispenses a plurality of beverages; (ii) an order processing system 18 which communicates with the dispensing apparatus 12 through a suitable dispenser communication channel 20; and (iii) a supplier system 22 which communicates with order processing system 18 through a suitable supplier communication channel 24 and which delivers drink supply containers 26 and $CO_2$ gas supply containers 28 to the homes 16 of the users of the system of the present invention. It should be appreciated that the dispenser communication channel 20 and the supplier communication channel 24 could be the same communication channel or the same data network such as the internet, as discussed below.

Beverage Dispensing Apparatus

The refrigerator 14 which houses the beverage dispensing apparatus 12 is preferably a conventional refrigerator which includes a refrigeration compartment (not shown), a refrigeration compartment door 14a, a freezer compartment (not shown) and a freezer compartment door 14b. Refrigerator 14 may be constructed in various shapes, sizes, designs and models including side-by-side door models as illustrated in FIG. 1 and upper and lower door models (not shown). Refrigerator 14 preferably includes standard mechanisms and cooling systems present in commercially available refrigerators. However, refrigerator 14 is specifically constructed, structurally and electrically, to house and accommodate the beverage dispensing apparatus 12 and its functions and use as described herein.

Figure 2:
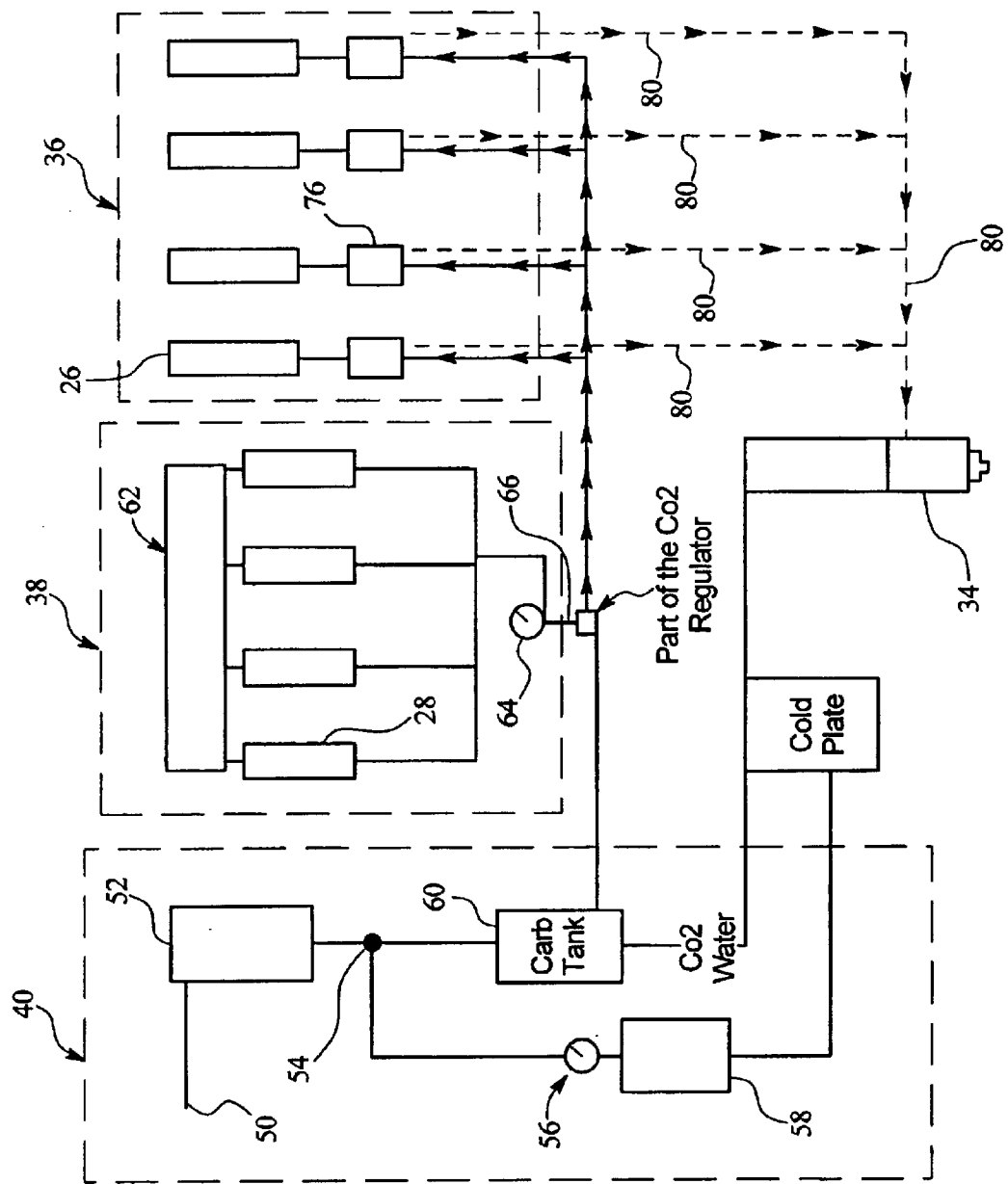
FIG. 2 is a schematic diagram of the dispensing apparatus of one embodiment of the system of the present invention.

Referring now to FIGS. 1 and 2, the beverage dispensing apparatus 12 includes: (i) a beverage dispensing computer or processor 30; (ii) a user interface panel or terminal 32; (iii) a dispenser or beverage mixing mechanism 34; (iv) a drink supply mechanism or apparatus 36; (v) a $CO_2$ supply mechanism or apparatus 38; (vi) a water supply mechanism or apparatus 40; (vi) a housing 42 for storing a plurality of drink supply containers 26 and at least one $CO_2$ supply container 28; (vii) a plurality of electrical communication lines 44; and (viii) a plurality of water, drink supply and $CO_2$ supply fluid communication lines 46. These components, including the $CO_2$ supply mechanism and drink supply mechanism 36, are preferably mounted at suitable places in refrigerator 12; however it should be appreciated that one or more of these components could be mounted in a housing adjacent to the refrigerator in accordance with the present invention.

In one embodiment of the present invention, the dispenser 34, the dispensing computer 30 and the panel 32 are mounted in the freezer compartment door 14b, and the housing 42 for the drink supply containers and the $CO_2$ supply container 28 is mounted in the refrigeration compartment of the refrigerator 14 as generally illustrated in FIG. 1. This embodiment enables the dispenser 34 to dispense ice from the door 14b of the freezer compartment as in conventional refrigerators and enables the drink supply containers 26 to be maintained at the desired temperature in the refrigeration compartment. However, this embodiment requires that the drink supply containers 26 be connected to the dispenser 34 through a plurality of fluid communication lines 46 and electrical communication lines 44 suitably mounted between the refrigeration compartment and the freezer compartment door 14b. If the housing 42 is mounted in the refrigeration compartment door 14a, the fluid communication lines 46 and electrical communication lines 44 must be suitably mounted between the refrigeration compartment door 14a and the freezer compartment door 14b through the refrigeration compartment and the freezer compartment.

In alternative embodiments of the present invention, the housing 42 for the drink supply containers 26 and $CO_2$ supply container 28 is mounted in an insulated area in the freezer compartment or the freezer compartment door 14b of the refrigerator. The insulated compartment prevents the drink supply from freezing due to the lower temperatures in the freezer compartment. The embodiment in which the housing 42 is located in an insulated area in the bottom of the freezer door 14b provides the additional advantage of a direct connection between the dispenser and the drink supply and $CO_2$ supply mechanisms without having one or more fluid communication lines 46 or electrical communication lines 44 extending from the freezer compartment to the freezer compartment door 14b. Moreover, this embodiment may be advantageous because freezer doors are generally less utilized and this embodiment facilitates a more direct connection with less parts and less potential problems (such as failures) between the drink supply and dispenser. This embodiment further facilitates a lower cost of manufacture.

The drink supply containers 26 preferably hold one liter of drink supply as discussed in more detail below. The drink supply containers 26 and $CO_2$ gas supply container 28 are suitably sized to fit within the housing 42. The housing 42 is preferably adapted to hold six one-liter drink supply containers 26 and at least one seventy-eight gram $CO_2$ supply container 28, canister or cartridge. One embodiment of the housing 42 would take up less space than in the refrigerator compartment or the insulated freezer area than such containers.

The system of the present invention thereby enables a user to better utilize the space in the user's refrigerator. In particular, in current refrigerators, the typical user has a plurality of beverage containers including carbonated and non-carbonated drink containers on the shelves and in the refrigeration compartment door of the user's refrigerator at any one time. These containers range in size from approximately four ounces to approximately sixty-four ounces and generally take up a substantial amount of space in the user's refrigerator. The system of the present invention enables the user to maintain a continuous supply of carbonated and non-carbonated beverages and thereby eliminates the need for the user to maintain many of the beverage containers currently present in a typical refrigerator. Accordingly, the present invention enables the user to free up or better utilize a substantial amount of space in the refrigerator compartment of the user's refrigerator.

The dispensing computer or processor 30, as described in more detail below, monitors all dispensing of drinks, the drink supply remaining in each drink supply container, the drinks ordered by the user, total drink consumption for each drink and all inputs or changes to the system or drink supply requested by the user.

In one embodiment of the system of the present invention, the beverage dispensing processor 30 communicates directly with the server in the order processing system 18 via a dial-up connection or modem. In another embodiment of the present invention, the beverage dispensing processor 30 communicates indirectly with the server in the order processing system via a dial-up connection to an internet provider which enables connectivity to the server. In a further embodiment of the present invention, the beverage dispensing processor 30 communicates indirectly with the server in the order processing system via a home gateway server 48 using a direct dial-up connection. In a still further embodiment of the present invention, the beverage dispensing processor 30 communicates indirectly with the server in the order processing system via a home gateway server 48 using an indirect dial-up connection to an internet provider which enables connectivity to the server. In a still further embodiment of the present invention, the beverage dispensing processor 30 communicates indirectly with the server in the order processing system via a home gateway server 48 using an indirect Ethernet home network internet connection with enables connectivity to the central server. As further discussed below, in any of these embodiments, the beverage dispensing processor automatically communicates to the order processing system, orders generated by the beverage dispensing processor 30, user registration information, user orders generated by the user, repair orders and user consumption information.

User Interfaces

The system communicates with the user through the user interface panel or terminal 32 which is preferably a conventional touch screen adapted to display a plurality of interfaces. Alternatively, buttons or other mechanical devices may be used in conjunction with the present invention. For energy saving purposes, the user interface panel 32 or the beverage dispensing apparatus 12 preferably includes a motion detector or sensor (not shown) in the refrigerator. The motion sensor detects when a user approaches the refrigerator and causes the user panel to illuminate the touch screen when the user approaches the refrigerator.

The user panel is adapted to display a plurality of interfaces to the user as illustrated in FIGS. 3a to 3J. The initial interface includes a plurality of and preferably six drink selections. However, it should be appreciated that the number of drink selections may vary in accordance with the present invention. In the example base or primary interface 48a illustrated in FIG. 3A displayed by the user interface panel 32, the drink selections include Pepsi®, Dr. Pepper®, 7UP®, Hershey's® Chocolate Drink, IBC® Root Beer, and A&W® Root Beer. The user may touch any of these symbols to dispense a drink.

This primary interface 48a also includes several other commands including a back command button 49a which causes the user panel to display a previous interface, a forward command button 49b which causes the user panel to display the next interface, a change brands button 49c which causes the user interface panel 32 to display the interfaces which enable the user to order different brands of beverages and to physically change beverages, a question button 49d which causes the user interface panel 32 to display interface contact information for the user including who to contact if the user has questions, a home button 49e which causes the user interface panel 32 to display an interface which provides information regarding the consumption of drinks through the system in the user's refrigerator, and an information button 49f which causes the user interface panel 32 to display interfaces which enable the user to find out more information regarding beverage available through the system. Buttons 49a to 49f are preferably accessible from every user interface, as illustrated in FIGS. 3A to 3J, to enable the user to navigate through the system and perform the functions provided by the system. It should be appreciated that additional functions or options could be added to the system and to the interfaces.

For instance, although not shown, the present invention contemplates providing the user an interface which enables the user to order extra drink supplies. The user may wish to do so for instance if the user is hosting an event such as a party. The interface preferably enables the user to select the drinks and input the date of the event and the number of people attending the event. The system could be adapted to assist the user in determining the necessary volumes based on standard volume calculation. The system preferably also ensures that the user receives the necessary supplies by sending a message to the user which is displayed on the panel a predetermined number of days before the event. The predetermined number of days would preferably enable the system enough time to send another order if necessary. It should be appreciated that the order processing system preferably includes a message screen with an O.K. button or other feature which is adapted to display other messages, information and advertisements for the user, sent over the dispenser communication channel to the dispensing computer, which the dispensing computer will display at designated times. It should also be appreciated, as discussed below, that the dispensing computer and the panel will provide the user with an interface for registration with the order processing system and may include a touch screen keyboard for enabling the user to type messages and send the messages to an administrator of the order processing system.

Figure 3A:
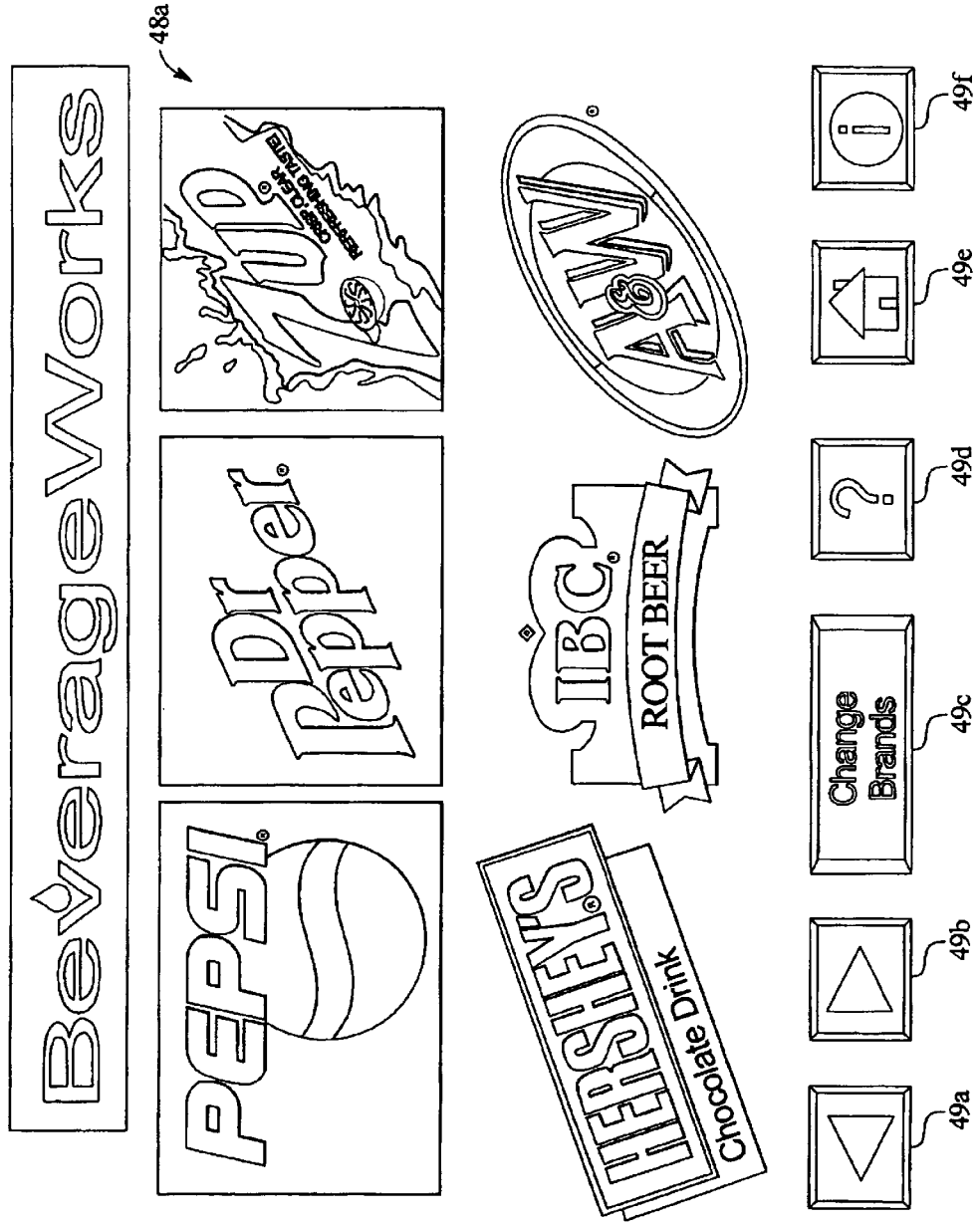
Figure 3B:
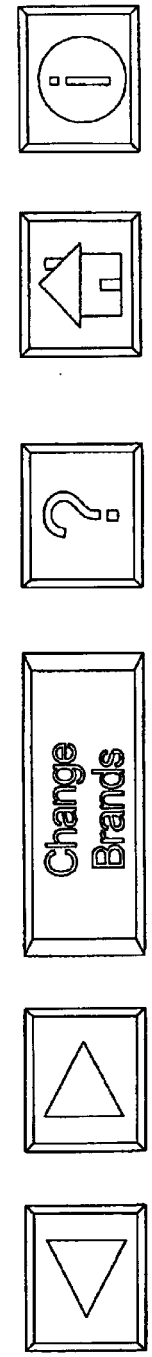
Figure 3C:
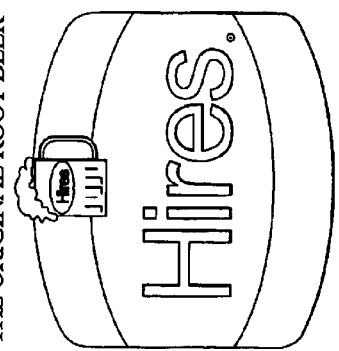
Figure 3C:
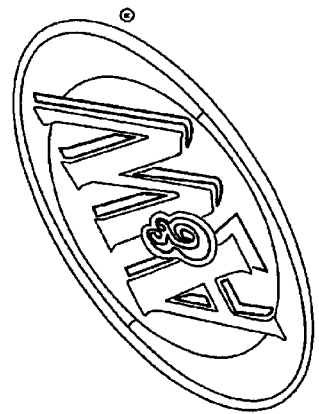
Figure 3C:
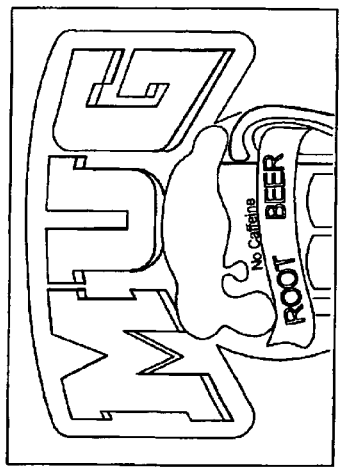
Figure 3C:
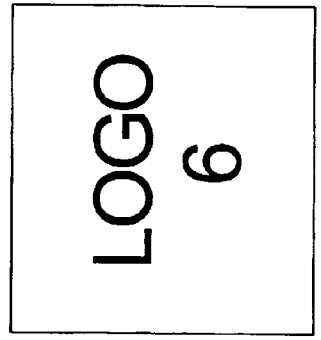
Figure 3C:
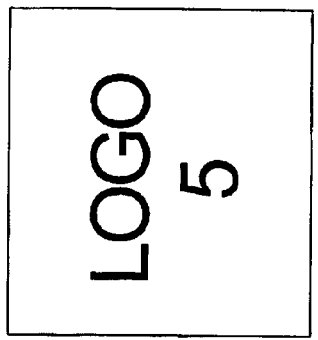
Figure 3C:
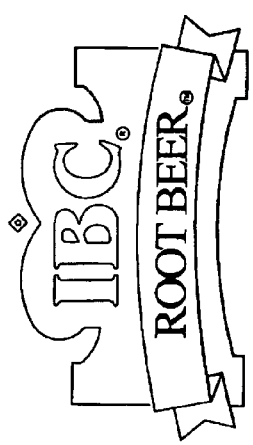
Figure 3C:
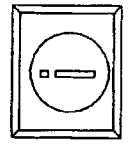
Figure 3C:
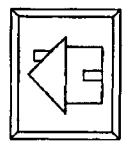
Figure 3C:
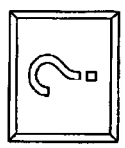
Figure 3C:
Figure 3C:
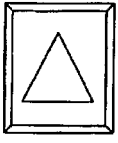
Figure 3C:
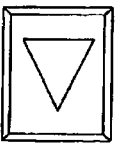

As illustrated in FIG. 3B, if the user presses the change brands button 49c, the dispensing computer displays a change brands interface 48*b*. The change brands interface 48*b* identifies or lists a plurality of types of beverages which the user can choose from through the system 10. These are generally categorized into soft drinks, juices, teas and isotonics. However, it should be appreciated that any type of beverage may be added to the list if the system dispenses that type of beverage. When the user touches one of the beverages such as root beer, the user panel displays a selection interface 48*c* as illustrated in FIG. 3C. The selection interface shows the variety of products in the selected category. For instance, the interface shows four types of root beers which the user can select through the system. As indicated by the blocks labeled "LOGO 5" and "LOGO 6," additional selections could be added to the interface and the system. If all of the selections do not fit on one screen, additional selection interfaces can be provided and the user will use the backwards or forwards buttons 49*a* and 49*b* to view all of the available drink selections. This may occur, for instance if the user is selecting diet and non-diet, caffeinated and decaffeinated cola products.

Figure 3E:
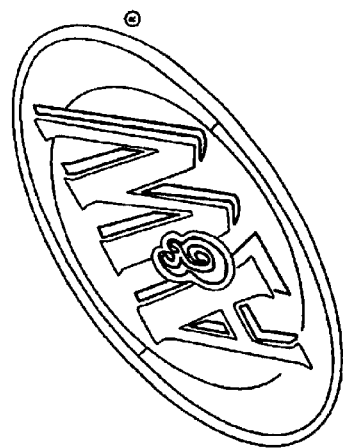
Figure 3E:
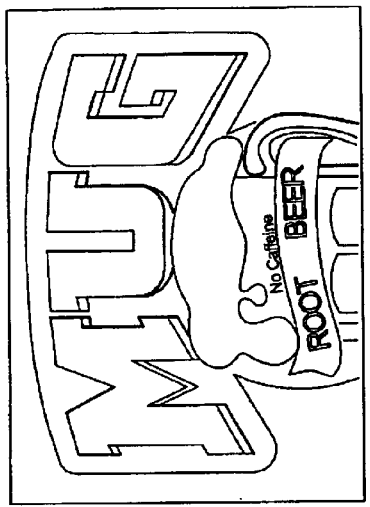
Figure 3E:
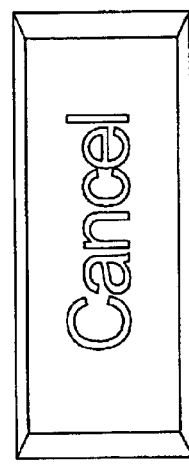
Figure 3E:
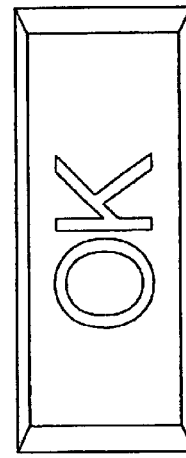
Figure 3E:
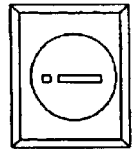
Figure 3E:
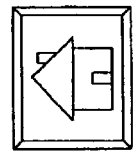
Figure 3E:
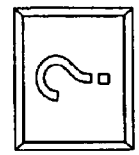
Figure 3E:
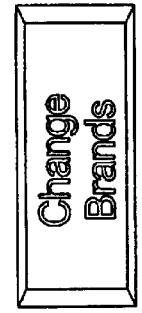
Figure 3E:
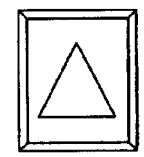
Figure 3E:
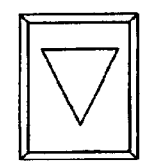

After the user selects a beverage which the user would like to obtain, the dispensing computer displays the replacement brand interface 48*d* as illustrated in FIG. 3D. The replacement brand interface 48*d* displays the user's current selection of beverage brands. Specifically, the system uses this interface to ask the user which brand the user wants to replace. The user preferably selects one of the six primary selections for replacement. It should be appreciated that the present invention contemplates having a different number of selections and suitable interfaces associated with such selections. After the user selects a brand to replace, the dispensing computer provides a replacement confirmation screen interface 48*e* as illustrated in FIG. 3E. This interface asks the user to confirm or cancel the order which replaces one type of drink with another type of drink. If the user presses OK button 49*g*, the dispensing computer sends the order to the order processing system. If the user presses the CANCEL button 49*h*, the dispensing computer does not send the order and preferably returns the user to the change brands interface 48*b*.

The dispensing computer replaces the new beverage selection logo on the primary interface when the new drink supply is delivered to the user and the user inserts the new drink supply into the housing 42 in the refrigerator. A change brands interface (not shown) or an additional interface is provided to the user for the user to inform the dispensing computer that the user is changing or replacing a drink supply or $CO_2$ supply container. In one embodiment, this could include an authorization code. Alternatively, the dispensing apparatus could read a bar code or other label on the drink supply container or $CO_2$ supply container that informs the dispensing computer of the change as further discussed below. Preferably, the interface provides a message screen which informs the user how to change the drink supply, the $CO_2$ supply and specifically which slot has the old drink supply. Each slot preferably is numbered, lettered, has other indicia or has an alternative designation for identifying the slot to the user and distinguishing the slots. The interface may also provide a change canister button which the user presses when the user is going to change a drink supply container or $CO_2$ supply container.

Figure 3F:
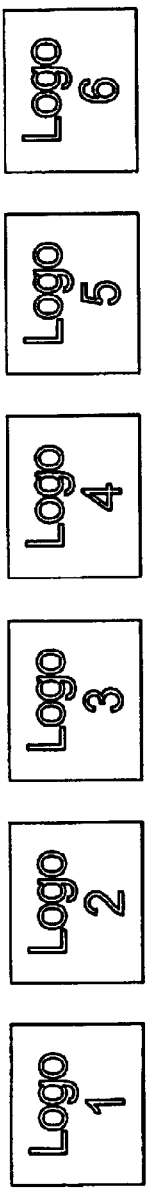
Figure 3F:
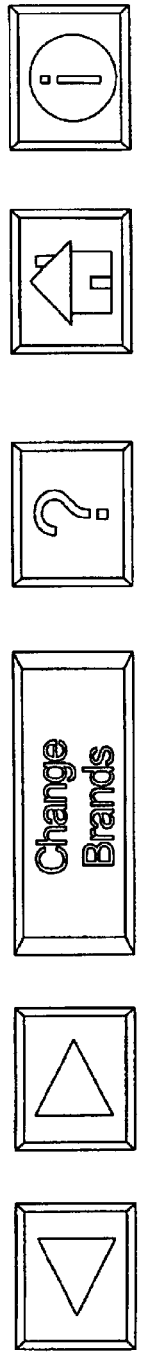

If the user presses the "I" or information button 49*f*, the user can obtain information about the user's use of the system though a consumption interface 48*f* illustrated in FIG. 3F. The dispensing computer tracks the average daily consumption history for each of the different drinks dispensed by the dispenser. For each drink, the system preferably displays the number of servings of the drink, the size of each serving, and the total volume of the dispensed drink. This system could also be used by the user to determine if too much soft drink and not enough juices are being consumed by the people in the user's household.

Figure 3G:
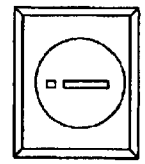
Figure 3G:
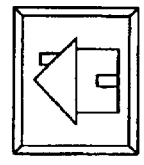
Figure 3G:
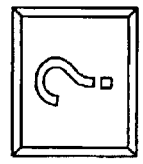
Figure 3G:
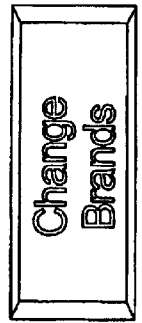
Figure 3G:
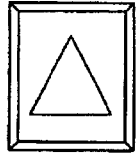
Figure 3G:
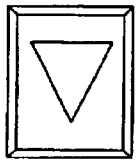
Figure 3H:
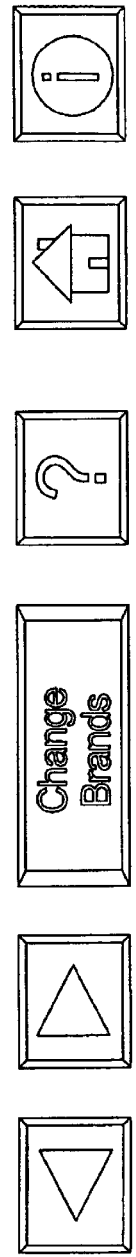

If the user presses the question mark button 49*d*, the dispensing computer displays a contact interface 48*g* which includes contact information such as a telephone number as illustrated in FIG. 3G which the user can use to contact the implementor of the order processing system or the supplier system.

Figure 3I:
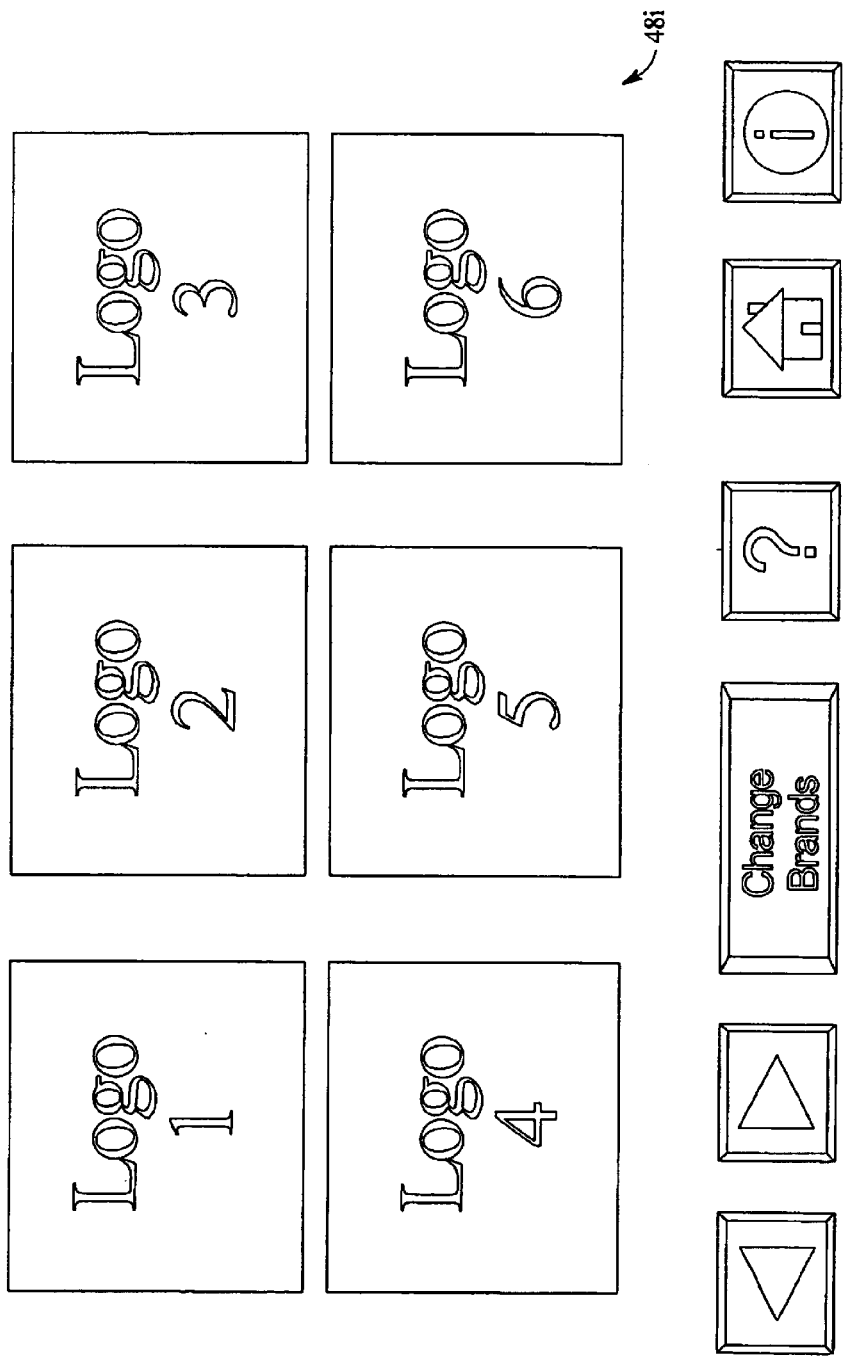

The user can also use the "I" or information button 49*f* to find out more information about certain beverages or brands. By pressing the information button 49*f*, the user can obtain the information interface 48*h* which lists all of the different types of beverages available through the system. If the user wants to find out more information regarding a beverage, the user touches one of the types of drinks, and the system displays a drink selection interface 49*i* which lists drinks and the logos for drinks in the area as illustrated in FIG. 3I.

Figure 3J:
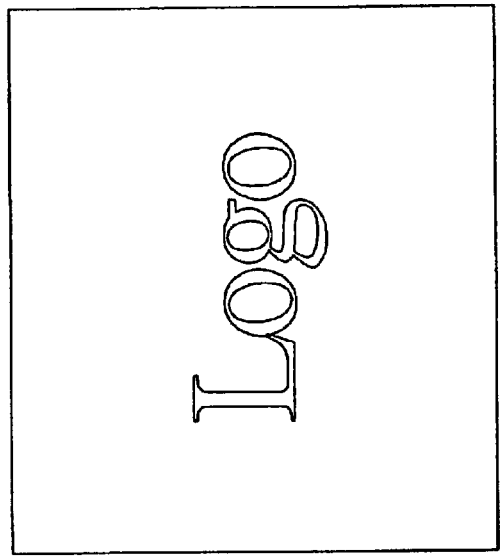
Figure 3J:
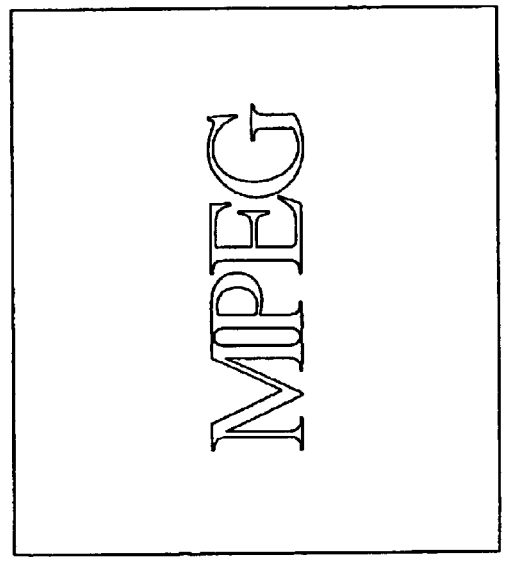
Figure 3J:
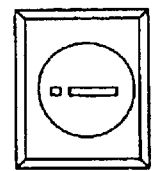
Figure 3J:
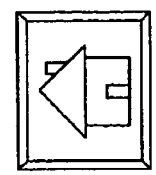
Figure 3J:
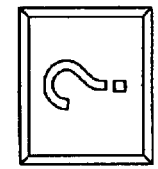
Figure 3J:
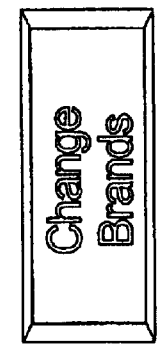
Figure 3J:
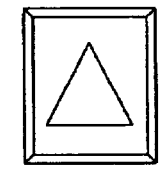
Figure 3J:
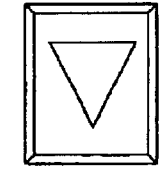

If the user wants to find out more information about a particular drink, the user can press the logo of the drink and the system will display a drink interface 48 which includes a specific information screen regarding the selected drink as illustrated in FIG. 3J. In particular, this interface may include a logo and textual information or in a preferred embodiment of the invention, the interface would be able to display a visual JPEG file or an audiovisual MPEG file. The JPEG or MPEG files could be downloaded into the system during communication with the order processing system on a regular basis, or these files could be downloaded from the order processing system upon a request from the user. The JPEG or MPEG file will be able to display photographs or audiovisual works such as a commercial regarding the selected beverage. The commercials or other information provided to the user could be selected on a national, regional, geographic or individual user basis. For instance, the system could provide information in Spanish to Spanish speaking users. Accordingly, the present invention is adapted to provide consumers with more information regarding brands of beverages and other information. The present invention also thus enables manufacturers to directly promote brands or beverages directly to the consumers or users of the system. Based on knowing the beverage consumption in a home, the system could be adapted to provide information or free beverage samples to consumers to influence their future purchasing. The system could also be used to provide information regarding other products or services to the user.

It should be appreciated that the system could be adapted to provide each individual in a household having the system with a separate user code which would enable the system to track individual use and consumption. The individual would enter this code each time the user obtained a drink from the dispenser. This would also enable a user such as a parent to monitor a child's beverage consumption and selection.

It should also be appreciated that the user interface panel could serve other functions such as enabling the user to adjust temperatures in the freezer compartment and refrigeration compartment.

It should further be appreciated that the user interface panel may provide the user with access to the internet, multimedia entertainment and other commercial information through the panel and suitable speakers installed in or on the refrigerator.

Water Supply Mechanism, $CO_2$ Supply Mechanism and Drink Supply Mechanism

Referring now back to FIGS. 1 and 2, one embodiment of the dispensing apparatus 12 of the present invention includes the dispenser 34, drink supply mechanism 36, $CO_2$ supply mechanism 38, water supply mechanism 40 and a plurality of commercially available pumps, tanks, regulators, valves, fluid lines, and a cold plate which co-act to provide and dispense a plurality of carbonated and non-carbonated drinks. It should be appreciated that the structure and components of the dispensing apparatus could vary in accordance with the present invention.

More specifically, in one embodiment of the present invention, the water supply mechanism 40 includes a conventional incoming water supply 50 connected to the refrigerator 14. The incoming water supply 50 is connected to a suitable water pump 52 which regulates the water pressure as necessary. Preferably, the water pump 52 is a commercially available Sureflo™ 115V AC pump, although any suitable pump which regulates the water pressure to at least one-hundred pounds per square inch is acceptable. The water pump 52 is connected to a two-way valve 54 which connects the water supply 50 to a water pressure regulator 56, a holding tank 58 and a carbonating tank 60.

The water pressure regulator 56 decreases the water pressure to a preferred manageable water pressure of fifty pounds per square inch. The preferred water pressure regulator is a Sureflo™ 50 PSI regulator, although any standard regulator may be employed. The holding tank 58 holds a reserve water supply and is connected to the dispenser 34. The water in the holding tank 58 is chilled and maintained at a relatively cool temperature by the refrigerator. When water is dispensed or more than one serving of drink is dispensed at any one time, the dispenser 34 uses the water from the holding tank 58. Alternatively, the water supply 50 may bypass the holding tank and be connected to the dispenser.

The water supply mechanism 40 also includes a carbonating tank 60 which mixes the water from the water supply 50 with the $CO_2$ gas from the $CO_2$ supply mechanism 38 to create a carbonated water supply connected to the dispenser 34. Carbonating tank 60 is any type of container which can withstand the pressure needed to carbonate water at the desired pressures. Carbonating tank 60 includes a conventional safety valve (not shown) which exhausts to the atmosphere whenever the pressure inside carbonating tank 60 exceeds a predetermined pressure limit. The safety valve closes when the pressure inside carbonating tank 60 is below a predetermined pressure limit. Carbonating tank 60 also includes a conventional back flow preventer (not shown) which prevents carbonated water supply from entering the water supply 50. Accordingly, the water supply mechanism 40 supplies water to the dispenser 34 as necessary.

The $CO_2$ supply mechanism 38 includes a housing for preferably storing $CO_2$ supply containers and in an alternative embodiment, a plurality of $CO_2$ containers and a suitable mechanism for releasing the $CO_2$ from the $CO_2$ supply containers. The $CO_2$ supply mechanism 38 which provides $CO_2$ gas includes a $CO_2$ gas manifold 62, one or more $CO_2$ gas containers or cylinders 28, and a $CO_2$ pressure regulator 64 connected by a plurality of gas lines 66. The $CO_2$ gas supply cylinders, cartridges or containers 28 safely store $CO_2$ gas at a range of eight hundred to one thousand pounds per square inch. Preferably, $CO_2$ gas containers 28 hold less than one hundred grams of $CO_2$ gas. In one preferred embodiment of the present invention the $CO_2$ containers hold seventy-eight grams or less of $CO_2$. This size $CO_2$ cartridge will on normal use be sufficient for carbonating the drinks made from two one-liter drink supply containers. Additionally, applicable shipping restrictions restrict the weight of individual canisters of $CO_2$ gas or other pressured gas containers by normal delivery services. It should be appreciated that the shipping regulations allow a plurality of $CO_2$ containers, each holding seventy-eight grams or less of $CO_2$ gas, to be shipped in the same box or packaging. Thus, several $CO_2$ containers can be shipped to the user in a single package along with the drink supply containers. It should also be appreciated that the $CO_2$ container size and pressure requirements and methods of shipment could vary in accordance with the present invention.

In one embodiment of the present invention, the $CO_2$ gas is preferably stored in $CO_2$ gas cylinders 28 at relatively high pressures such as eight hundred pounds per square inch and the $CO_2$ gas cylinders are connected to a $CO_2$ gas manifold 62 which equalizes the pressure in the $CO_2$ gas cylinders. The $CO_2$ gas manifold 62 is preferably adapted to hold $CO_2$ gas at a maximum pressure of one thousand pounds per square inch, preferably eight hundred pounds per square inch.

The manifold 62 is preferably connected to one or more $CO_2$ gas lines 66 which route the $CO_2$ gas from $CO_2$ gas manifold 62 to the $CO_2$ pressure regulator 64. The $CO_2$ pressure regulator 64 preferably is a conventional regulator capable of regulating or decreasing the pressure of the $CO_2$ gas to a reduced $CO_2$ pressure in the approximate pressure range of forty to sixty pounds per square inch and preferably fifty-five pounds per square inch.

In one embodiment of the present invention, the dispensing apparatus includes a two-way $CO_2$ valve 70 (not shown) in the gas line 66 which connects the manifold 62 to the carbonating tank 60 and the drink supply pumps 76 as discussed below. The $CO_2$ gas routed to carbonating tank 60 enters carbonating tank 60 at its reduced $CO_2$ pressure and mixes with the water supply at an increased water pressure in order to produce a carbonated water supply.

$CO_2$ gas becomes excited as its temperature rises. When carbonated drinks are dispensed and poured, the $CO_2$ gas escapes in a "fizz" which detracts from the taste and pleasure of carbonated drinks. The lower the temperature of the carbonated water supply, the less $CO_2$ gas escapes. Therefore, it is preferable to use a cold carbonation process employing a cold plate 72 to rapidly decrease the temperature of the carbonated water supply. The cold plate 72 is preferably connected to the carbonated water supply to chill the carbonated water as it exits the carbonating tank 60. The cold plate 72 preferably includes one or more metal tubes which are routed through a metal block. Preferably the metal tubes are made of stainless steel and the metal block is made of aluminum or steel. Cold plate 72 may be of any suitable size, though the preferable size is eight×twelve×two inches. Whether or not a cold plate 72 is included in dispensing apparatus 12, the carbonated water supply is routed to dispenser 34.

The drink supply mechanism 36 supplies a plurality of drink syrups from the plurality of drink supply containers 26. The drink supply mechanism includes a housing for storing a plurality of drink supply containers and at least one pump or other suitable mechanism for drawing the drink supply from the drink supply containers 26. In one embodiment of the present invention, at least one and preferably a plurality of drink supply pumps 76 are connected to the drink supply containers 26. The drink supply pumps 76 operate on $CO_2$ gas in the range of zero to seventy pounds per square inch and create a vacuum to draw drink syrup from the drink supply containers 26 in a conventional manner. Drink supply pumps 76 have one or more inlets for $CO_2$ gas and drink syrup in addition to one or more outlets for $CO_2$ gas and drink syrup. The dispensing computer 30 is electrically connected to and operates a conventional $CO_2$ release mechanism (not shown) when a user presses one of the drink selections on the primary interface 48*a*. Thus, in one embodiment of the present invention, each drink supply container is connected to a pump which is adapted to draw the drink syrup through the fluid communication lines to the dispenser when the user request one of the drinks by touching the drink logo on the touch screen. In an alternative embodiment, the pumps are directly electrically connected to the dispensing computer. These embodiments preferably include a collapsible plastic bag in a box (known in the industry as a bag-in-box or B.I.B.). The plastic bag collapses as drink syrup is drawn out of the bag. In this embodiment of the present invention, the plastic bag drink supply container is protected by a cardboard box.

In an alternative embodiment of the present invention, the dispensing apparatus does not include pumps for the drink supply containers. In this alternative embodiment, the cap of the drink supply container includes a gas supply inlet tube and a drink supply outlet tube. When the dispenser is activated, the $CO_2$ gas is forced into the drink supply container through the gas inlet tube and the drink supply is forced out of the container through the drink supply outlet tube. The pressure of the $CO_2$ forced into the drink supply container is approximately five to ten pounds per square inch ("psi"), and accordingly, does not provide sufficient pressure to carbonate the drink supply. The present invention thus contemplates a pumpless system for facilitating the supply of drink supply to the dispenser.

The drink supply container of this embodiment of the present invention could be any suitable container. In one alternative preferred embodiment, each container is a one-liter plastic bottle similar to conventional one-liter plastic soft-drink bottles. A one-liter drink supply bottle will produce approximately two hundred and eighty-eight ounces of soft drinks (based on a five water to one syrup ratio) which is roughly equal to a case of or twenty-four twelve ounce cans of soft drink. For other drinks such as juices where the ratio of juice to water is higher (i.e., three to one), a one-liter drink supply will produce approximately one hundred and seventy-two ounces.

Referring back to FIG. 2, the reserve water supply, the carbonated water supply and drink syrup are routed to the dispenser 34. The dispenser 34 includes a plurality of relatively small tubes (not shown) which carry the carbonated water supply, reserve water supply and drink syrup to a dispensing valve (not shown). Dispenser 34 may be any standard dispenser having a system of tubes leading to a valve, although the dispenser is preferably solenoid activated. This dispenser preferably includes eight tubes and eight solenoids which includes one solenoid for each of the six drink supply containers, one solenoid for carbonated water and one solenoid for non-carbonated water. Accordingly, two solenoids are opened to dispense a drink as the drink is mixed or carbonated on the fly.

Although not shown, the dispensing apparatus could include a bar code reader or other label recognition system which reads a bar code or other label on the drink supply containers 26 and the $CO_2$ supply containers 28. The bar codes or other labels would include pertinent information regarding the drink syrup in the container. When the user replaces the drink supply and the $CO_2$ container, the bar code reader would read the bar code or label and would know that a new or replacement drink supply and $CO_2$ supply is being placed in the housing. The dispensing computer can then update the drink supply tracking data. The supply containers will preferably come with detailed instructions which describe how the user should replace the container and which containers to replace.

Communication Channels and the Home Network

With reference to FIG. 1, in one embodiment of the present invention as indicated above, the user's home includes a home gateway server 48. The dispensing computer 30, other appliances 80 in the home 16 and at least one computer 82 in the home 16 preferably will communicate with the home gateway server 48 via wireless communications 84 or via hardwire lines (not shown) in the home 16. The system thus preferably includes a local area network (LAN), and specifically a home area network (HAN) designed to network home appliances, audio and visual equipment, and computing devices.

Because HAN is presently largely unavailable in homes and because common residential internet access is often slow and sometimes unreliable, the dispensing computer may communicate directly over the communication channel via a server dial-in, telephone line connection. Thus, if the home does not include a home gateway server, the dispensing computer 30 would preferably include a modem (not shown) which enables the dispensing computer 30 to exchange data or directly communicate with the order processing system 20 via communication channel 20. The modem would be electrically connected to telephone (not shown) which would provide access to dispensing communication channel 20. Preferably, the modem would be modular and replaceable so that dispensing computer 30 can utilize alternative communication technology and dispensing communication modes as they become available in the home.

The dispensing communication channel 20 and supplier communication channel 24 are any suitable communication channels which enable dispensing computer 30 and supplier system 22 respectively, to communicate with and transfer data to and from the order processing system 18. The dispensing communication channel 20 extends beyond the home, using a digital subscriber line (DSL), fiber optics, satellites, or high speed cables. The dispensing communication channel 20 could also be a transmission control protocol (TCP) Internet Protocol (IP) Internet connection or a cable or fiber optic connection.

All communications between the dispensing computer 30 and order processing system 18, and between the order processing system 18 and the supply system 22 are preferably protected with suitable security measures, and preferably a proprietary protocol. The proprietary protocol may include any means for preventing unauthorized users from conducting a communication between dispensing computer 30 and order processing system 18.

Dispensing Computer, Ordering Processing System and Supplier System

Figure 4:
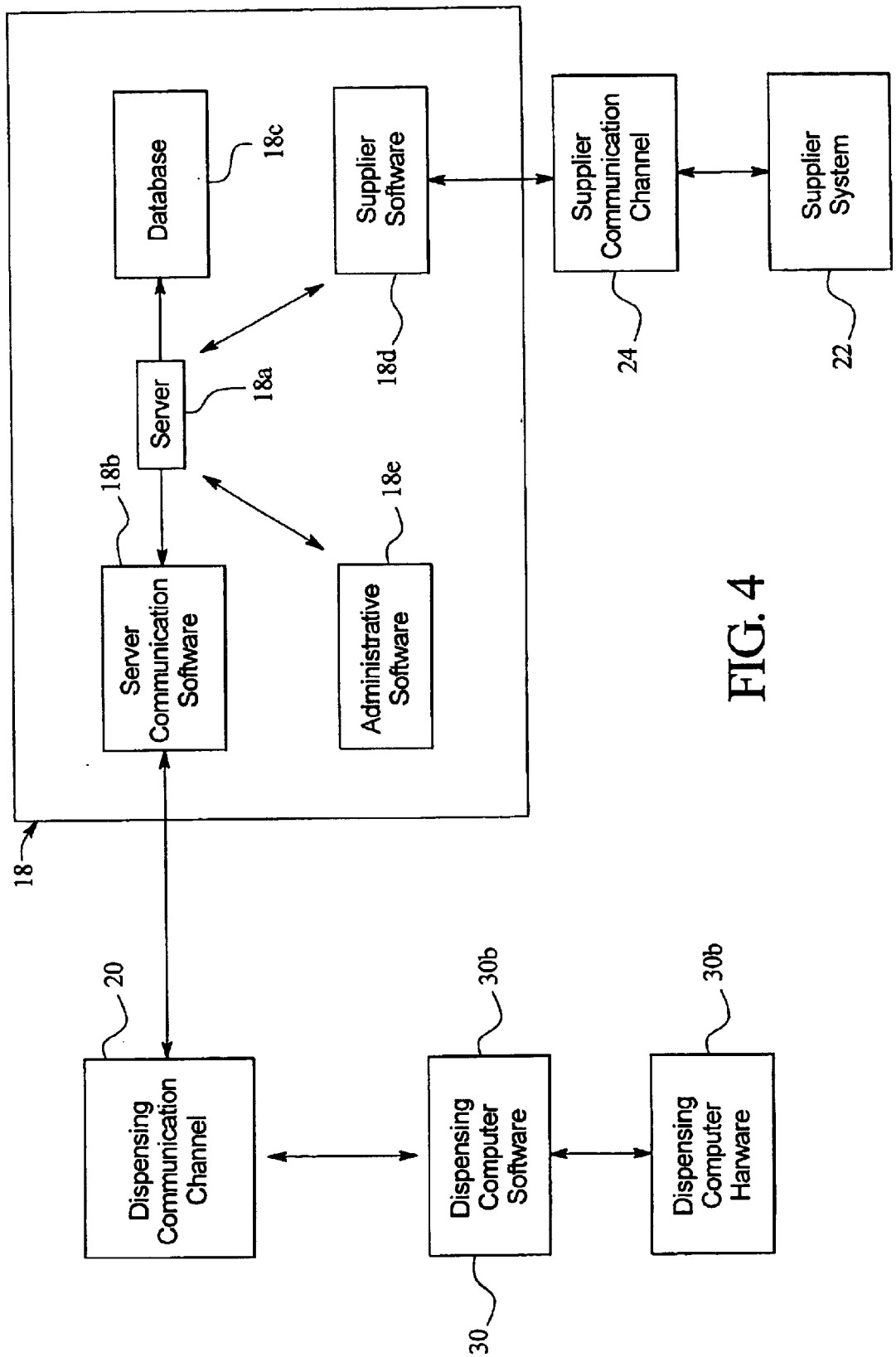
FIG. 4 is a schematic diagram of the dispensing computer, order processing system and supply system of one embodiment of the system of the present invention.

Referring now to FIGS. 1 and 4, the dispensing computer 30 includes dispensing computer software 30*b* which is used by the dispensing computer hardware 30*a* to communicate with order processing system 18.

The order processing system 18 includes a server 18*a*, server communication software 18*b* for communicating with the dispensing computer 30, a relational database 18*c* connected to the server 18*a*, database software (not shown) for accessing and storing information on database 18*c*, supplier software 18*d* for communicating with the suppliers, administrative software 18*e* for handling the administrative functions of the order processing system, at least one and preferably a plurality of administrative terminals (not shown) and output devices (not shown) connected to the server over a computer network system such as an Ethernet system. Server 18a may be any feasible server type although the preferred server type is Microsoft SQL Server. The relational database 18c is adapted to collect and store data regarding consumers usage and consumption of beverages in geographic areas. The administrative computers and one or more output devices enable administrative computer operators to access the server, make any necessary changes and to generate reports regarding the users, drink consumption and orders. Order processing system 18 receives the orders from the dispensing computer, stores various categories of useful data related to users, supplies and services and sends orders to the appropriate suppliers as discussed below.

Administrative computer operators use administrative computers which are loaded with server administrative software 18e and supplier software 18d. Server administrative software 18e provides a graphical user interface which administrative computer operators use to access, use, format, manipulate and interact with the data available on database 18c. Preferably, administrative computer operators process orders and respond to user needs regarding low drink supply events, low $CO_2$ gas supply events and technical problems. Administrative computer operators determine the particular products or services needed by a user, contact a supplier of such products or services and direct the supplier to supply such products or services. Administrative computer operators also generate various graphic and statistical reports, preferably general customer reports, customer invoices, consumption trend graphs, usage forecasts, postage, labels, and demographics, preferably beverage usage by zip code, area code, city, and state.

The suppliers may be the system implementor, or manufacturers, distributors, bottlers or vendors of the drink supply. As indicated above, the suppliers preferably, but not necessarily, are located or have a place of business near the users. Each supplier preferably has a supplier system 22 which communicates with the order processing system 18 through the supplier communication channel 24. The supplier system 22 includes a server (not shown), server communication software (not shown) for communicating with the order processing system, at least one administrative terminal (not shown) connected to the server, and conventional output devices (not shown) for printing user supply and repair orders and related documentation.

The supplier system 22 obtains orders and obtains the relevant user data necessary to deliver the supplies or services to the users. Suppliers can deliver the drink supply containers and $CO_2$ supply containers directly to the user. Alternatively, suppliers can use an independent contractor such as the United Parcel Service, Federal Express or the postal service to deliver the drink supply containers and $CO_2$ supply containers to the user. In a further alternative embodiment, the supplier can be a local bottler or can supply local bottlers with orders to process for delivery.

In the preferred embodiment of the present invention, the order processing system also preferably includes billing and payment software for facilitating billing users of the system and payments to the suppliers. In an alternative embodiment of the present invention, the supply system includes billing and payment software for facilitating billing users of the system and payments to the implementor of the order processing system.

During the operation of the distribution system 10 as discussed below, the levels of drink supply and $CO_2$ gas supply decrease. Dispensing computer 30 monitors these supply levels by monitoring the time the dispenser dispenses each drink. When the levels decrease to a certain amount, dispensing computer 30 automatically transmits an order to order processing system 18. The dispensing computer 30 also monitors dispensing apparatus 24 for break downs or technical problems. If the dispensing apparatus 12 needs repaired, dispensing computer 30 transmits an order to order processing system 18.

At regular intervals and preferably at least once per day, the supplier system 22 communicates with the order processing system 18 to check for any new orders. If there is a new order, the supplier system 22 obtains the order and arranges for supplies to be delivered to the user or for a repair visit as requested.

It should be appreciated that the order processing system will preferably be adapted to download updates to the dispensing computer software to the dispensing computer and updates to the supply software to the supply system. It should also be appreciated that the dispensing computer, order processing system and supply systems could be employed for residential counter-top beverage dispensing units such as those currently made by Bev Star, Inc. In one embodiment of the present invention, to allow for a larger number of users, the system uses telephone lines to communicate information. The gateway server is installed with a dial up modem that will allow it to communicate with the server in the order processing system. The communications systems are preferably modular to allow the modem to be supplemented with improved technology as it becomes available. The dispensing computer unit will communicate to the gateway server, at a minimum of once an hour. All communications to the server of the order processing system preferably take place late at night to lessen the chance of using the user's telecommunications lines when the user desires to use such lines.

Figure 5:
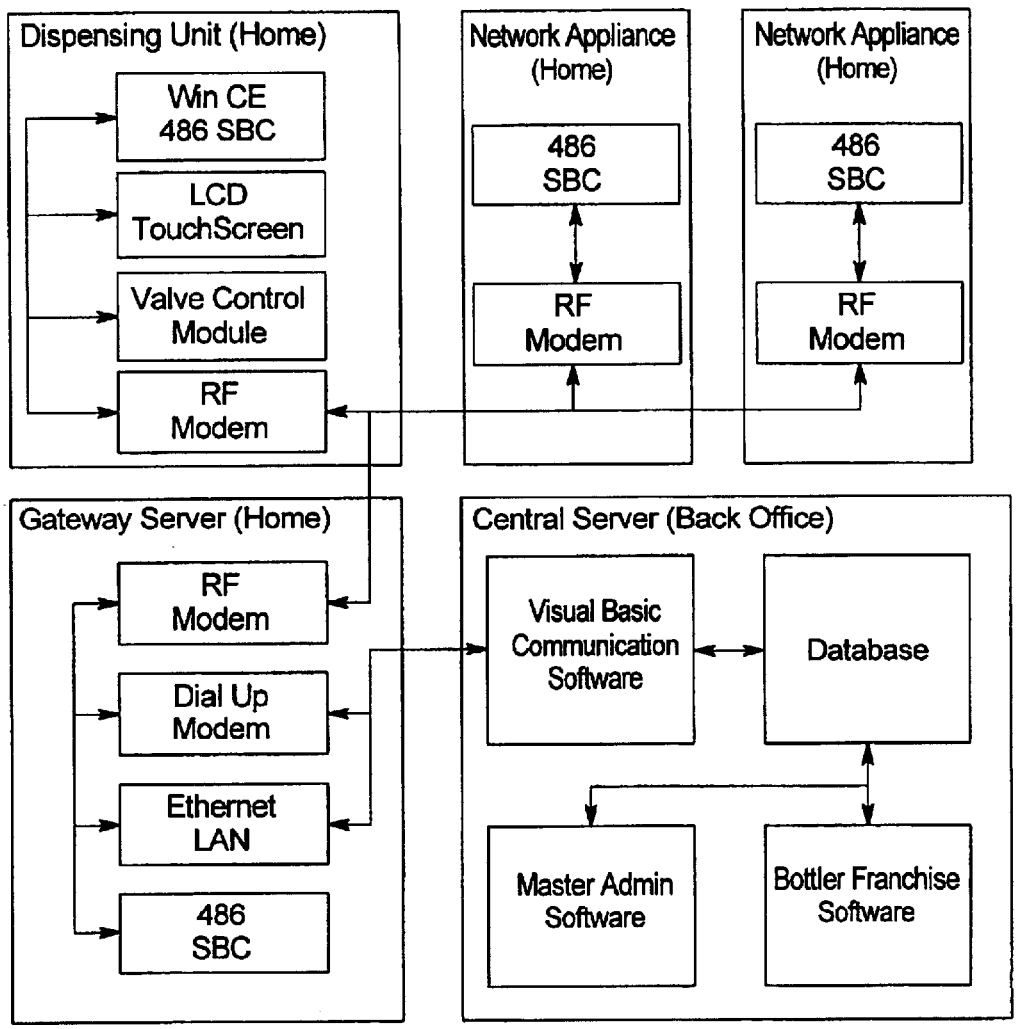
FIG. 5 is a more detailed schematic diagram of one preferred embodiment of the architecture of the computer and communication systems of the system of the present invention.

In one embodiment of the present invention illustrated in FIG. 5, the server of the order processing system includes three main software applications including: (a) an application that is responsible for communications with the gateway server wherein calls placed by the gateway server are answered and control turned over to the database application once communications have been established; (b) a database application which stores the information provided by the gateway server to generate reports, trend graphs, usage forecasting, etc; and (c) a graphical user interface application for the server for making reports or accessing data with the database.

In this embodiment, the gateway server preferably includes: (a) a gateway server application to initiate RF communications/polling with the dispensing computer; and (b) a gateway server application to initiate dial up communications with the server of the order processing system and upload information provided by the dispensing computer. In this embodiment, the dispensing computer is a 486 SBC with video and sound capability. The SBC has a provision for a Disk On Chip (DOC) flash disk, which will contain the Windows CE operating system. The dispensing computer communicates serially to two devices. The communications take place on COM 3 and COM 4 at 9600 baud, one start bit, one stop bit, no parity, and 8 data bits.

In this embodiment, the device connected to COM 3 is a valve control processor or VCP. The VCP is responsible for opening and closing all eight valves (or solenoids) of the system (6 syrup, 1 $CO_2$ and 1 water) under command of the CE-SBC. The VCP only speaks when spoken to by the CE-SBC. The VCP is also responsible for keeping usage totalizers for each of the drink canisters and the $CO_2$ canister. These totalizers are individually set or reset upon command of the CE-SBC. The CE-SBC and the VCP communicate using a comma delimited, fixed field length, ASCII packet structure.

The CE-SBC should communicate a minimum of every five seconds to ensure that if the VCP has corrupted data that the data can be reconstructed (send totalizers and current selection to VCP). If the VCP receives a bad packet it will ignore the packet and not respond. The CE-SBC should then timeout and resend the message, continuing this process until a valid response has been received. If a VCP response has not been received within five seconds, a message should be displayed on the status line of the display.

The device connected to COM 4 is the RF Modem or RFM. The RF Modem is used by the gateway server to poll the CE-SBC. The CE-SBC uses the RFM to communicate with the gateway server using a comma delimited ASCII packet structure.

The gateway server should communicate with the CE-SBC a minimum of every four hours. Communication starts with the gateway issuing an appropriate command. If the SBC status returned does not indicate a low canister warning or a "cannot communicate with VSP" warning then the totalizers are stored in the last totalizer read buffer and nothing more is done. If the gateway receives a low canister warning response from the CE-SBC, it will then, after storing away the totalizers, issue an appropriate command. Upon storing the usage information, it will then initiate communications with the server of the order processing system. If a "cannot communicate with VSP" warning is indicated, then the gateway will also initiate communication with the server of the order processing system.

If at any time the gateway server receives a bad packet it will ignore the packet and not respond. The gateway should then timeout and resend the message, continuing this process a maximum of four times. If after the fourth time a good packet has not been received, the gateway should wait for the next scheduled communication session to try again. If a valid packet still has not been received after the second communications session, the gateway server will notify the server of the order processing system.

If the CE-SBC receives the gateway status indicated "unable to contact the central server" then a message should be displayed on the status line of the display. The gateway server will communicate with the server of the order processing system on demand or at a minimum of every three days. All communication with the central server is preferably initiated by the gateway server.

If at any time the server of the order processing system receives a bad packet it will ignore the packet and not respond. The gateway server should then timeout and resend the message, continuing this process a maximum of four times. If after the fourth time a good packet has not been received, the gateway should wait for the next scheduled communication session to try again. If the server of the order processing system has not received a good data packet within three days, a warning should be issued on the server of the order processing system.

In this embodiment, a back office application is in charge of answering calls for the server of the order processing system. This application is also responsible for populating an access database with information provided by the gateway server. This application may change to a client/server SQL application. The application will display the information from the last call. Two database tables will be used, customer and dispenser data.

Operation of the System

Figure 6B:
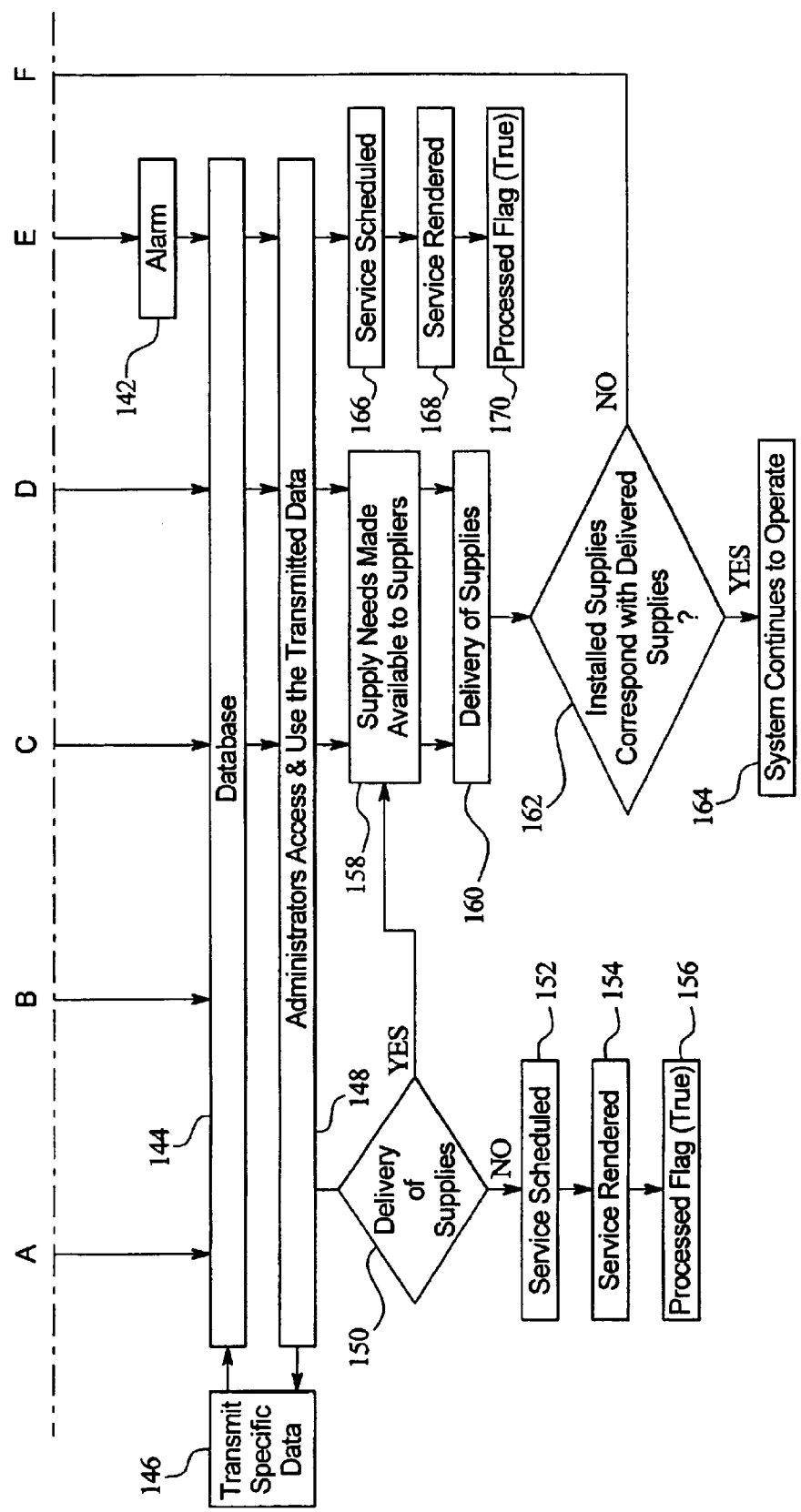
FIG. 6 is a flow diagram of the operation of one embodiment of the system of the present invention.

Referring now to FIG. 6, to use the system 10 of the present invention, a user must purchase a refrigerator 12 containing the dispensing apparatus 12 as indicated by block 110, or purchase a refrigerator conversion kit as discussed below. After the refrigerator 12 is delivered and installed (or the conversion kit is installed), the user opens an account with the system implementor who operates the order processing system as indicated by block 112. The user preferably opens an account with the system implementor using a registration process provided through the user interface panel. The touch screen interface panel preferably displays a keyboard through which the user registers. The registration process includes entering user information, drink selections and user credit card information. During the registration process, the entry of the zip code of the user will determine the supplier of the products for the user. It should be appreciated that alternative registration processes may be employed in the system of the present invention such as registration by telephone, mail or the internet (via a stand-alone or networked internet access device).

It should be appreciated that refrigerator manufacturers such as General Electric and Whirlpool are currently working on incorporating computer systems into their refrigerators. Such computer systems include interfaces and processors. The present invention could be incorporated into such systems. For instance, GE is currently planning to use a Windows CE computer interface architecture and Whirlpool is currently planning to use a Sun Microsystems—Java architecture. It should be appreciated that the present invention is preferably adapted for either system or any other suitable refrigerator computer system.

The dispensing computer 30 may be initialized or configured during installation or during the first communication with the order processing system 18 during which the order processing system 18 transmits set-up data or files to dispensing computer 26 as indicated by block 114. The set-up data or files preferably include drink information, computer programs, graphic files, and advertisements and messages as described above. The registration process described above is part of the initial set-up process.

During the initialization process or the registration process, the user will order a plurality of drinks and will need to agree to a price for the drinks. The user interface will provide pricing information to the user for enabling the user to make the determination as to which drinks the user will order. It should be appreciated that the prices may be different in different regions and that the suppliers or local bottlers may need to set the prices. This information is preferably delivered to the user via the order processing system. It should also be appreciated that the prices may change. The system will preferably send any price change message to the dispensing computer and display the price changes to the user in the message screen or interface discussed above. The user will need to agree to the price changes. The user's agreement to the price changes is transmitted to the order processing system. It should also be appreciated that the order processing system may provide a web site and other communication means such as a toll-free number as discussed above to enable the user to determine prices, obtain help or find out more information about the use of the system.

In one alternative embodiment of the present invention, dispensing computer 30 generates a warning message if, after the elapse of a pre-determined warning time, the dispensing computer 30 has not communicated with order processing system 18 as indicated by diamond 116. The warning time may be any period of time, though preferably it is three days. The warning message 118 appears on screen 32 to alert the user of a communication problem. The warning message 118 may be in audio, video or textual form or any combination thereof.

In the alternative embodiment, after generation of a warning message, either the shutdown time elapses without a communication or a communication occurs before shutdown time elapses. Shutdown time may be any period of time greater than the warning time, though preferably seven days. As indicated by diamond 120, if the shutdown time elapses without a communication, the beverage distribution and dispensing system 10 shuts down as indicated by block 122. If a communication occurs before the elapse of warning time or shutdown time, a subsequent communication can be initiated.

The user may initiate a communication with the order processing system 18 to place an order for supplies, to change the type of drink the user desires or for any other suitable purpose as described in detail above and as indicated by block 124. The dispensing computer 30 may also initiate communications with the order processing system 18 based on its monitoring of the dispenser and dispensing apparatus.

The dispensing computer 26 determines if there is a low drink supply for any one of the plurality of drink supplies in the refrigerator, (a low $CO_2$ supply if monitored) or a technical, electrical or mechanical problem with the dispensing apparatus or dispensing computer, as respectively indicated by diamonds 128, 130 and 132. The dispensing computer communicates these events to the order processing system. Additionally, at regular intervals (preferably every seven days), the dispensing computer communicates the status of the dispensing apparatus (including supply levels) and the dispensing computer to the order processing system, as indicated by diamond 126.

Preferably, a low drink supply event exists when the drink supply is within a certain amount of days of depletion based on the user's average drink consumption, preferably in the range of two to three days as discussed below. Preferably, drink supply is in a syrup form, although it should be appreciated that other forms of drink supply could be employed in conjunction with the present invention. It should also be appreciated that the dispensing computer can order drink supply at any predetermined time, as otherwise set by the implementor or as ordered by the user.

In one embodiment of the present invention, a predetermined amount of $CO_2$ supply containers is delivered to the user with the drink supply. In the alternative embodiment of the present invention where $CO_2$ levels are directly monitored, the dispensing computer monitors the time the $CO_2$ release mechanism is open in addition to monitoring the time carbonated drinks are dispensed and the time non-carbonated drinks are dispensed from the system. The dispensing computer determines the $CO_2$ supply level from this data. It should be appreciated that the dispensing computer is adapted to calculate use of $CO_2$ gas for powering the pumps or for filling the drink supply canisters in this calculation. A low $CO_2$ gas supply event exists when the amount of $CO_2$ gas supply is within a certain amount of days of depletion, preferably in the range of two to three days time based on the calculations of $CO_2$ gas supply as indicated above. Preferably, the $CO_2$ supply canisters hold eight grams of $CO_2$ in view of current regulations.

A technical problem event 132 exists at any time the dispensing apparatus 12 are in need of repair, or there is a communication problem between the dispensing computer and the order processing system 18.

Referring now to FIG. 7, the communications between the dispensing computer and the order processing system include predetermined basic information generally including the identification of the dispensing apparatus 12, the amount of drink supply, the amount of $CO_2$ gas supply, and the purpose for the communication. Preferably, such information will include at a minimum, the basic data 200 identified in FIG. 7, which includes: (i) a dispensing apparatus unit identification 202; (ii) a drink supply or concentrate identification 204; (iii) the drink supply amount per pump 206; (iv) the $CO_2$ gas supply amount 208; (v) the event identification 210; (vi) usage information 212; and (vi) set-up files or other information.

Preferably the average daily usage is calculated for each beverage and used for re-order drink supply and $CO_2$ supply to maintain an adequate supply for the user at all times. The dispensing computer also calculates the total carbonated and non-carbonated drink supply to maintain $CO_2$ usage and to maintain an adequate $CO_2$ supply. In the embodiment having one $CO_2$ container which is used for several beverages, if the beverages are used evenly, the $CO_2$ supply will be depleted before any one of the individual drink supplies. The dispensing computer accounts for this and all other beverage use scenarios. Accordingly, it is preferable to have at least one spare $CO_2$ supply container maintained by the user.

The dispensing computer will track the canister levels for each drink supply that is installed in the dispenser apparatus. This is accomplished by tracking the time in seconds each beverage is dispensed. Using the constant flow rate of a dispensed beverage along with the time the beverage has dispensed a relatively accurate canister level can be calculated when required. The constant flow rate is given by knowing the regulated psi and inner diameter of the dispensing hose.

In another embodiment, the usage information 212 includes a modified thirty day average of the amount of each drink dispensed. In particular, the average daily consumption is based upon normal use during a period of time such as thirty twenty-four hour periods. Abnormal periods of usage which may occur when the user has an event or when the user is on vacation are preferably ignored in this calculation. The basic data 200 is transmitted to the order processing system 18 and stored in the appropriate database 18c as indicated by blocks 134 and 138, respectively.

When a communication is caused by a low drink supply, the dispensing computer 30 transmits an order for the drink supply to the order processing system 18 as indicated in block 138. This order includes the drink supply identification 204 and the number of containers of drink supply needed. Preferably one $CO_2$ container is shipped with one drink supply container. In the alternative embodiment, when the $CO_2$ supply is low, the dispensing computer transmits an order for $CO_2$ gas supply to the order processing system as indicated by block 138. This order preferably includes the number of $CO_2$ gas supply containers or cartridges needed.

In one embodiment of the invention, the system 10 prevents the user from installing supplies which were not ordered by the dispensing computer 30. In this embodiment, the user must enter into the dispensing computer 30 a drink supply authorization code which was included in the supply shipment. The beverage distribution and dispensing system 10 will not dispense any new drink unless the drink supply authorization code has been entered. The order processing system 18 generates and stores a drink supply authorization code for such order and transmits the code to the dispensing computer when the order processing system receives the order. Alternatively, the dispensing computer could create the code or be preloaded with codes. When the drink supply is prepared for delivery to a user, the drink supply authorization code is associated with the drink supply containers. Preferably, the drink supply authorization code is a twelve digit number encoded on the containers of the drink supply 80.

In another embodiment, the dispensing computer tracks the amount of drink supply that is ordered from the order processing system. If the drink supply installed into the dispenser is not the drink supply that was ordered or if the amount of a particular type of drink supply exceeds the amount that was ordered, the dispensing apparatus may be adapted to shut down or display an error message. One reason for tracking of supplies is to verify that the drink supply originated from a legitimate source. This will prevent the user from obtaining drink supply from unauthorized third party sources. If more drink supply is installed into the dispenser compared to the amount ordered, this would indicate that supplies are being obtained from outside sources.

In one embodiment of the present invention, each beverage has a unique 4 digit Beverage ID. The first two digits indicate the type of beverage classification and the second two digits the beverage within the classification. These IDs are assigned by the system implementor. When the user selects a beverage from the selection screen they are indirectly selecting the beverage canister bay with the associated beverage ID number. When the CE-SBC informs the gateway server of the totalizers it also sends the associated beverage IDs along. If a user changes from one beverage to another beverage, dispensing computer will know that one of the beverage canisters is to be replaced upon the next order.

In one embodiment when the user is attempting to change an empty canister, the user will press a change canister button and the CE-SBC will automatically lock the dispenser and display the appropriate message in the bottom status bar. Once the user has made the switch and double checks all the hose connections, the user will press the OK button, the CE-SBC will then unlock the dispenser and remove the status message. If the user at any time cancels the operation by any means, the CE-SBC will also unlock the dispenser.

When a communication is caused by a technical problem, dispensing computer 24 transmits an order for repair service to the order processing system which is also as indicated by block 138. This order includes a service identification and an alarm. The service identification includes an identification of the specific type of service needed, and preferably a numeric or alphanumeric code identification. The service identification also includes a description of the service needed. The alarm alerts the user that a technical problem has occurred as indicated by block 142. The alarm is preferably a visual or textual message generated on panel 32.

As indicated by block 140 in FIG. 6, when dispensing computer 30 transmits an automatic order to order processing system 18, a process flag is set as false and stored in the database 18c. As indicated by block 170 and discussed in detail below, the process flag is set as true when the supplies or services requested by the triggering event have been provided or rendered to the user.

In all communications, the dispensing computer 30 transmits the basic data 88 to the order processing system 18 through the dispensing communication channel 20. Server or processor 18b inputs the basic data 202 in the database 18c. In certain communications, the order processing system 18 will transmit certain data, images and electronic files to the dispensing computer 30. Graphic images are preferably transmitted using JPEG type files, and movies are preferably transmitted using MPEG type files as indicated above.

As further illustrated in FIG. 6, database 18c preferably stores several types of data 213 including user data 214, supplier data 216, dispensing apparatus data 218, dispensing computer setting data 220, drink supply data 222, event data 224 and service data 226.

User data 214 preferably includes a user identification code, a supplier identification code, the company name if the user is a business, a dispensing apparatus unit identification code, the last name of the user, the first name of the user, the street address of the user, and the city, state, zip code and phone number of the user. User data 214 may also include demographics on individual household members, visitors and others in addition to data about the user who opened an account to use the beverage distribution and dispensing system 10.

Supplier data 216 preferably includes a supplier identification code and the company name of the supplier 20. Dispensing apparatus data 218 preferably includes a dispensing apparatus unit identification code, a plurality of drink supply identifications and associated drink supply levels for each beverage dispensed by the dispensing apparatus, the level of $CO_2$ gas and the dispensing computer setting identification code. The number of drink supply levels will depend on the number of drink supply containers used by the dispensing apparatus and the number of different drinks ordered by the user. This information will be contained in the dispensing computer and transferred to the order processing system during initialization. Dispensing computer setting data 220 preferably includes a dispensing computer setting identification code and a dispensing computer setting. Drink supply or concentrate data preferably includes a drink supply identification code, the drink supply name and the logo of the drink supply.

Event data 224 preferably includes: (i) an identification code of events for a low drink supply, low $CO_2$ gas supply, and a technical problem; (ii) a date and time stamp for recording the event occurrence; (iii) the type of event; (iv) the number of drink supply containers (preferably bags) needed; (v) the drink authorization code; (vi) the number of $CO_2$ containers (or cartridges) needed; (vii) a service identification code; and (viii) a process flag (true or false).

Service data 224 preferably includes a service identification code and a description of the service. It should be appreciated that the basic data and additional data recited above is preferred and that other data could be included in the beverage distribution and dispensing system 10 of the present invention.

If the user initiated the communication session as indicated in block 124 in FIG. 5, the basic data and the additional data is transmitted to the order processing system and stored in database 18c. The administrative computer operators may be employed by the dispensing system implementor to provide customer service and generally manage the data on database 18c. Administrative computer operators may obtain specific information about a user by accessing the database, as indicated by block 148, or reviewing completed product registration forms, speaking with the user over the telephone, e-mail or through other communication methods. The administrative computer operators may add data which they gather to database 18c as indicated by block 146.

When the order processing system 18 receives a drink supply order, a $CO_2$ supply order, or both, the order processing system 18 preferably communicates the order to supplier system 22 designated to serve the particular user. Alternatively, when such an order is received by the order processing system 18, an administrator may communicate the order to a supplier system 22 designated to serve a particular user as indicated by block 158.

The supplier system 22 facilitates the delivery of the ordered drink supply containers, $CO_2$ supply containers or both to the user, as discussed below. Preferably, at least one $CO_2$ supply container is delivered with each drink supply order (unless the user does not use carbonated beverages or a sufficient amount of carbonated beverages). If service is needed, the administrator contacts the user and schedules a service date as indicated by block 166. A supplier or third party repair service may render the service as indicated by block 168. The user installs the drink supply, $CO_2$ supply or both in the refrigerator. If the monitoring system or dispensing computer 30 determines that the drink supply installed corresponds to the drink supply ordered as indicated by diamond 162, the beverage distribution and dispensing system 10 continues to operate, as indicated by block 164.

If the installed drink supply does not correspond to the order, the dispensing apparatus 30 may be adapted to shut down as indicated by block 122. When a shut down occurs, electrical power is blocked to water pump 52 of the dispensing apparatus 12, as discussed below. The result of the blocked electrical power is that the dispensing apparatus 12 will not dispense any drink.

Supplier system will use a reliable deliverer (not shown) to deliver the drink supply containers and $CO_2$ gas supply containers to the user. Deliverer may be an employee of supplier or a reliable outside package delivery company such as the United Parcel Service, Federal Express, the postal service or other similar delivery organizations. Deliveries will be made to the place of delivery within a certain delivery time, preferably within three days after an order or communication is transmitted to the order processing system. Preferably each delivery of drink supply includes at least two containers of drink supply and one container of $CO_2$ gas supply.

Dispensing computer 30 monitors the amount of each type of drink dispensed and calculates the amount of each drink supply and $CO_2$ gas supply used. Each time an order or low drink supply message is transmitted to the order processing system 18, dispensing computer 30 tracks the amount of drink supply ordered.

An alternative embodiment of the present invention could include one or more mechanical dispensing buttons for dispensing drinks mounted on the order panel or adjacent to the dispenser. Dispensing buttons are electrically connected to butterflies which are connected to dispensing valves. When a user pushes a dispensing button, the associated butterfly opens the associated dispensing valve to dispense the water or type of drink corresponding to the user's selection. When the user pushes a dispensing button for a drink, butterflies operate dispensing valves, and the appropriate drink supply and the carbonated water supply flow into the nozzle of the dispenser. Drink supply and carbonated water supply are mixed inside the nozzle.

A specific carbonated water supply to drink supply ratio or brix must be met in order for the drink to provide the proper flavor and pleasure. For soft drinks, the preferred brix of carbonated water supply to drink supply is five to one. For juices, the preferred brix of carbonated water supply to drink supply is three to one.

One embodiment of the present invention contemplates an autobrix system or automatic brixing. The automatic brixing system would enable the user to readily switch between carbonated and non-carbonated beverages. Another embodiment of the present invention contemplates a manual brix adjustment system. In a manual system, if a drink selection changes from carbonated to non-carbonated, a technician may need to adjust the manual system by screwing or unscrewing flow control screws located in the dispenser in a conventional manner.

It should also be appreciated that a conversion kit may be used to convert a standard refrigerator into a refrigerator having the dispensing apparatus of the present invention. Such a conversion kit may include a stand-alone unit which has a separate power source and various fluid lines connecting to the refrigerator.

It should be appreciated that the system could be adapted to dispense non-concentrated, ready-to-drink or pre-mixed beverages such as milk, beer, wine and juices. As mentioned above, it should be appreciated that the beverage distribution and dispensing system could be adapted for a powder or solid drink supply.

While the present invention has been described in connection with what is presently considered to be the most practical and preferred embodiments, it is to be understood that the invention is not limited to the disclosed embodiments, but on the contrary is intended to cover various modifications and equivalent arrangements included within the spirit and scope of the claims. It is thus to be understood that modifications and variations in the present invention may be made without departing from the novel aspects of this invention as defined in the claims, and that this application is to be limited only by the scope of the claims.

The invention is claimed as follows:

1. A refrigerator comprising:
   a housing including a refrigeration compartment and at least one door which provides access to the refrigeration compartment;
   a drink supply apparatus supported by the housing, the drink supply apparatus configured to removably hold a plurality of removable drink supply containers, wherein each of the drink supply containers can contain a variable volume of drink syrup, and the drink syrup in each of the drink supply containers can have a different flavor;
   a water supply apparatus supported by the housing, the water supply apparatus including at least one water communication line which supplies water;
   a gas supply apparatus supported by the housing, the gas supply apparatus configured to hold at least one gas supply container which can contain a variable volume of carbon dioxide gas;
   a beverage dispensing apparatus supported by the housing and operable to dispense a plurality of servings of beverages from: (a) the drink syrups supplied by the drink supply apparatus; and (b) carbonated water from the water supplied by the water supply apparatus and the carbon dioxide gas supplied by the gas supply apparatus;
   a display device supported by the housing;

a processor in communication with the drink supply apparatus, the gas supply apparatus, the water supply apparatus, the display device and an order processing system, the order processing system operable to process orders for supplies of drink syrups of a designated group of flavors;

at least one input device in communication with the processor, the input device operable to enable a user to provide a plurality of inputs receivable by the processor; and at least one memory device accessible by the processor, the memory device storing:
(a) a plurality of instructions executable by the processor to cause the display device to display a plurality of different images, each of the images associated with a different one of the flavors within the designated group of flavors;
(b) a plurality of instructions executable by the processor to enable the user to select one or more of the images using the input device; and
(c) a plurality of instructions executable by the processor to send an order to the order processing system for the flavors of the drink syrups associated with the selected images.

2. The refrigerator of claim 1, wherein the memory device stores a plurality of instructions executable by the processor to cause the display device to display an image representing consumer information associated with at least one of the flavors of the drink syrups within the designated group of flavors.

3. The refrigerator of claim 1, wherein the memory device stores a plurality of instructions executable by the processor to cause the display device to display an image representing price information associated with at least one of the flavors of the drink syrups within the designated group of flavors.

4. The refrigerator of claim 1, wherein the memory device stores a plurality of instructions executable by the processor to cause the display device to display an image representing information about the servings of beverages dispensed by the beverage dispensing apparatus.

5. The refrigerator of claim 1, wherein the input device includes a touch screen operable with the display device.

6. The refrigerator of claim 5, wherein the each of the images is selectable.

7. The refrigerator of claim 5, wherein the memory device stores a plurality of instructions executable by the processor to cause the display device to display an image representing a touch screen keyboard.

8. The refrigerator of claim 1, wherein the memory device stores a plurality of instructions executable by the processor to: (a) enable the user to produce a message using the input device; (b) cause the display device to display an image representing the message; and (c) send said message to the order processing system.

9. A refrigerator comprising:

a housing including a refrigeration compartment and at least one door coupled which allows access to the refrigeration compartment;

a drink supply apparatus supported by the housing, the drink supply apparatus configured to removably hold a plurality of removable drink supply containers, wherein each of the drink supply containers can contain a variable volume of drink syrup, and the drink syrup in each of the drink supply containers can have a different flavor;

a water supply apparatus supported by the housing, the water supply apparatus including at least one water communication line which supplies water;

a gas supply apparatus supported by the housing, the gas supply apparatus configured to hold at least one gas supply container which can contain a variable volume of carbon dioxide gas;

a beverage dispensing apparatus supported by the housing and operable to dispense a plurality of servings of beverages from: (a) the drink syrups supplied by the drink supply apparatus; and (b) carbonated water including the water supplied by the water supply apparatus and the carbon dioxide gas supplied by the gas supply apparatus;

a display device supported by the housing;

a processor in communication with the drink supply apparatus, the gas supply apparatus, the water supply apparatus, the display device and an order processing system, the order processing system operable to process orders for supplies of drink syrups of a designated group of flavors;

at least one input device in communication with the processor, the input device operable to enable a user to provide a plurality of inputs receivable by the processor; and at least one memory device accessible by the processor, the memory device storing:
(a) a plurality of instructions executable by the processor to cause the display device to display a plurality of different images, each of the images associated with a different one of the flavors within the designated group of flavors;
(b) a plurality of instructions executable by the processor to cause the display device to display an image representing consumer information associated with each of the flavors of the drink syrups within the designated group of flavors;
(c) a plurality of instructions executable by the processor to cause the display device to display an image representing price information associated with each of the flavors of the drink syrups within the designated group of flavors;
(d) a plurality of instructions executable by the processor to enable the user to select one or more of the images using the input device; and
(e) a plurality of instructions executable by the processor to send an order to the order processing system for the flavors of the drink syrups associated with the selected images.

10. The refrigerator of claim 9, wherein the consumer information includes nutrition information.

11. The refrigerator of claim 9, wherein the price information includes a price associated with a designated volume of each of the flavors of the drink syrups within the designated group of flavors.

12. The refrigerator of claim 9, wherein the memory device stores a plurality of instructions executable by the processor to cause the display device to display an image representing information about the servings of beverages dispensed by the beverage dispensing apparatus.

13. The refrigerator of claim 9, wherein the input device includes a touch screen operable with the display device.

14. The refrigerator of claim 13, wherein the each of the images is selectable.

15. The refrigerator of claim 13, wherein the memory device stores a plurality of instructions executable by the processor to cause the display device to display an image representing a touch screen keyboard.

16. The refrigerator of claim 9, wherein the memory device stores a plurality of instructions executable by the processor to: (a) enable the user to produce a message using the input device; (b) cause the display device to display an image representing the message; and (c) send said message to the order processing system.

17. A refrigerator comprising:
   a housing including a refrigeration compartment and at least one door which allows access to the refrigeration compartment;
   a drink supply apparatus supported by the housing, the drink supply apparatus configured to removably hold a plurality of removable drink supply containers, wherein each of the drink supply containers can contain a variable volume of drink syrup, and the drink syrup in each of the drink supply containers can have a different flavor;
   a water supply apparatus supported by the housing, the water supply apparatus including at least one water communication line which supplies water;
   a gas supply apparatus supported by the housing, the gas supply apparatus configured to hold at least one gas supply container which can contain a variable volume of carbon dioxide gas;
   a beverage dispensing apparatus supported by the housing and operable to dispense a plurality of servings of beverages from: (a) the drink syrups supplied by the drink supply apparatus; and (b) carbonated water including the water supplied by the water supply apparatus and the carbon dioxide gas supplied by the gas supply apparatus;
   a display device supported by the housing;
   a processor in communication with the drink supply apparatus, the gas supply apparatus, the water supply apparatus, the display device and an order processing system, the order processing system operable to process orders for supplies of drink syrups of a designated group of flavors;
   at least one input device in communication with the processor, the input device operable to enable a user to provide a plurality of inputs receivable by the processor; and
   at least one memory device accessible by the processor, the memory device storing:
   (a) a plurality of instructions executable by the processor to cause the display device to display a plurality of different images, each of the images associated with a different one of the flavors within the designated group of flavors;
   (b) a plurality of instructions executable by the processor to cause the display device to display an image representing consumer information associated with each of the flavors of the drink syrups within the designated group of flavors;
   (c) a plurality of instructions executable by the processor to cause the display device to display an image representing price information associated with each of the flavors of the drink syrups within the designated group of flavors;
   (d) a plurality of instructions executable by the processor to cause the display device to display an image representing information about the servings of beverages dispensed by the beverage dispensing apparatus;
   (e) a plurality of instructions executable by the processor to enable the user to select one or more of the images using the input device; and
   (f) a plurality of instructions executable by the processor to send an order to the order processing system for the flavors of the drink syrups associated with the selected images.

18. The refrigerator of claim 17, wherein the consumer information includes nutrition information.

19. The refrigerator of claim 18, wherein the price information includes a price associated with a designated volume of each of the flavors of the drink syrups within the designated group of flavors.

20. The refrigerator of claim 17, wherein the memory device stores a plurality of codes associated with a plurality of users wherein a different one of the codes is associated with each of the different users, the processor using the codes to track information about the users' histories of consuming the beverages.

* * * * *